(12) United States Patent
Krummel et al.

(10) Patent No.: US 12,625,946 B2
(45) Date of Patent: May 12, 2026

(54) FORENSICS MODULE AND EMBEDDED SYSTEM

(71) Applicant: Diebold Nixdorf Systems, GmbH, Paderborn (DE)

(72) Inventors: Volker Krummel, Paderborn (DE); Peter Guenther, Bielefeld (DE); Gennadij Liske, Herford (DE)

(73) Assignee: Diebold Nixdorf Systems, GmbH, Paderborn (DE)

( * ) Notice: Subject to any disclaimer, the term of this patent is extended or adjusted under 35 U.S.C. 154(b) by 112 days.

(21) Appl. No.: 18/287,812

(22) PCT Filed: Apr. 25, 2022

(86) PCT No.: PCT/EP2022/060832
§ 371 (c)(1),
(2) Date: Jan. 3, 2024

(87) PCT Pub. No.: WO2022/229060
PCT Pub. Date: Nov. 3, 2022

(65) Prior Publication Data
US 2024/0193564 A1 Jun. 13, 2024

(30) Foreign Application Priority Data

Apr. 27, 2021 (DE) .......................... 102021110768.7

(51) Int. Cl.
*G06F 15/16* (2006.01)
*G06F 9/54* (2006.01)
(Continued)

(52) U.S. Cl.
CPC ................................... *G06F 21/50* (2013.01)

(58) Field of Classification Search
CPC ........... G06F 21/50; G06F 21/57; G06F 21/64
(Continued)

(56) References Cited

U.S. PATENT DOCUMENTS

| | | | |
|---|---|---|---|
| 10,079,842 | B1 | 9/2018 | Brandwine et al. |
| 11,947,930 | B1 * | 4/2024 | Zhang ..................... G06F 7/582 |

(Continued)

FOREIGN PATENT DOCUMENTS

| | | |
|---|---|---|
| EP | 0893763 A1 | 1/1999 |
| EP | 3798883 A1 | 3/2021 |

(Continued)

OTHER PUBLICATIONS

International Search Report dated Aug. 11, 2022, filed in the corresponding PCT Application; 5 pages.
(Continued)

*Primary Examiner* — Hamza N Algibhah
(74) *Attorney, Agent, or Firm* — Black McCuskey

(57) ABSTRACT

According to various embodiments, a forensics module (250) for an embedded system may comprise: a secured memory area (202*s*) comprising first data implementing a key (305*s*); an interface (208) for reading (301) second data (302) representing a system state of the embedded system (150); and one or more than one processor (204) configured to: read (301) the second data (302) by means of the interface (208), wherein the second data (302) comprises a plurality of data sets; determine (303) a commitment (310) to a plurality of aperture values, each aperture value being associated with exactly one of the plurality of data sets, based on the second data (302) and using a cryptographic commitment process configured such that each data set may be individually verified using the commitment (310) and the respective associated aperture value; encrypt (305) the second data (302) and the plurality of aperture values using the key (305*s*).

18 Claims, 15 Drawing Sheets

Figure 1:
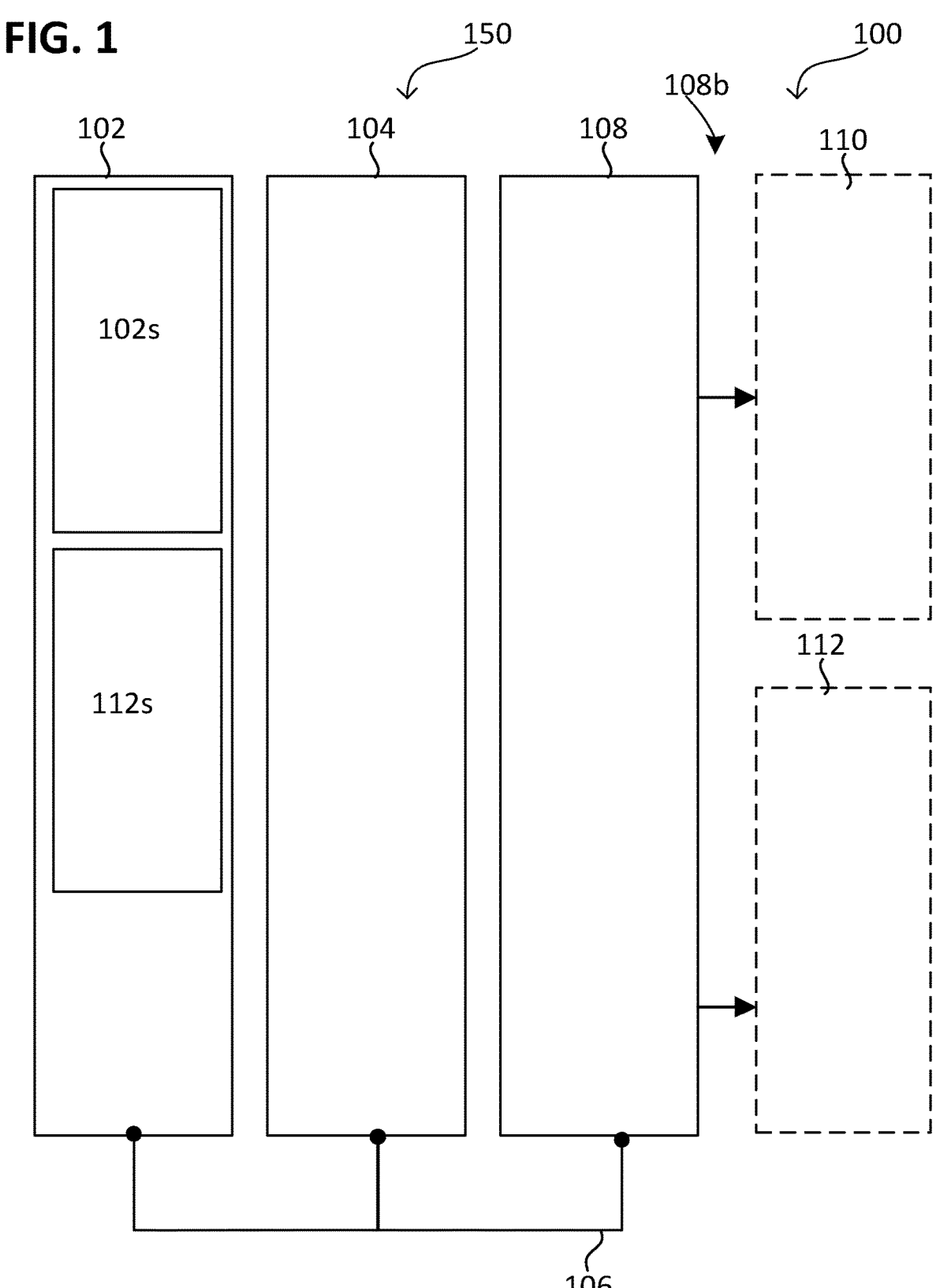

(51) Int. Cl.
*G06F 21/50* (2013.01)
*H04L 29/06* (2006.01)

(58) Field of Classification Search
USPC .......................................................... 713/187
See application file for complete search history.

(56) References Cited

U.S. PATENT DOCUMENTS

| | | | | |
|---|---|---|---|---|
| 2007/0102920 A1* | 5/2007 | Bi | ........................ | B42D 25/309 283/113 |
| 2008/0310629 A1* | 12/2008 | Van Der Veen | ........ | G06T 1/005 380/201 |
| 2010/0070769 A1 | 3/2010 | Shima et al. | | |
| 2011/0090541 A1* | 4/2011 | Harper | ................... | G06V 40/13 715/705 |
| 2011/0158404 A1* | 6/2011 | Deen | ..................... | H04L 9/0891 380/44 |
| 2012/0210427 A1 | 8/2012 | Bronner et al. | | |
| 2013/0301832 A1* | 11/2013 | Harper | ................... | G06F 21/32 380/243 |
| 2015/0304289 A1 | 10/2015 | Cho et al. | | |
| 2016/0080397 A1* | 3/2016 | Bacastow | .......... | H04L 63/1433 726/1 |
| 2016/0154963 A1* | 6/2016 | Kumar | ................. | G06F 21/602 713/189 |
| 2017/0033934 A1* | 2/2017 | Camenisch | .......... | H04L 9/3263 |
| 2019/0286806 A1* | 9/2019 | Robinson | ............. | H04W 12/10 |
| 2019/0334730 A1* | 10/2019 | Endress | ............. | H04L 67/1042 |
| 2020/0058022 A1* | 2/2020 | Ma | ..................... | G06Q 20/3674 |
| 2020/0099701 A1* | 3/2020 | Bacastow | ............. | G06F 21/552 |
| 2020/0387601 A1* | 12/2020 | Schat | ..................... | G06N 20/00 |
| 2021/0028939 A1* | 1/2021 | Trevethan | .......... | G06Q 20/1235 |
| 2021/0083862 A1* | 3/2021 | Pointcheval | .......... | H04L 9/0618 |
| 2021/0297268 A1* | 9/2021 | Weng | ........................ | H04L 9/50 |
| 2022/0076253 A1* | 3/2022 | Chaum | ................ | G06Q 20/322 |
| 2022/0179958 A1* | 6/2022 | Robison | ................. | G06F 21/57 |
| 2022/0200806 A1* | 6/2022 | Grobelny | ............. | H04L 9/0643 |
| 2022/0239502 A1* | 7/2022 | Anderson | ................ | H04L 9/50 |
| 2023/0153426 A1* | 5/2023 | Grobelny | ............. | G06F 21/572 726/22 |
| 2023/0267209 A1* | 8/2023 | Almulhim | .......... | G06F 11/1469 726/26 |
| 2024/0187231 A1* | 6/2024 | Krummel | ............. | G06F 21/566 |

FOREIGN PATENT DOCUMENTS

| | | | | |
|---|---|---|---|---|
| WO | | 2022/229060 A1 | 11/2022 | |
| WO | | WO-2023233419 A1 * | 12/2023 | ............. G16Y 40/20 |

OTHER PUBLICATIONS

Written Opinion dated Aug. 11, 2022, filed in the corresponding PCT Application; 7 pages.

Bibliographical Data retrieved Oct. 17, 2023, in the corresponding PCT Application; 2 pages.

Office Action dated Nov. 2, 2021, filed in the corresponding Priority Application; 5 pages.

* cited by examiner

150

400

102

104

402

404

Cortex-M4 CPU

Vcc1

1
2
3
4

5
6
7
8

GND

106

500

700

1250

1204

1200

| $S_n$ | App | FLASH | |
| $S_2$ | RTOS | FLASH | |
| $S_1$ | BL | FLASH | |
| $S_0$ | RoT | ROM | Root Key |
| | Global | FLASH/RAM | Boot Nonce |

1202

1350

1300

1204

~1301

| App | FLASH | |
|-----|-------|---|
| RTOS | FLASH | |
| BL | FLASH | Attestation Key 1 |
| RoT | ROM | Root Key |
| Global | FLASH/RAM | Boot Nonce |

~1202

1204

~1303

| App | FLASH | Attestation Key 3 |
|-----|-------|-------------------|
| RTOS | FLASH | Attestation Key 2 |
| BL | FLASH | Attestation Key 1 |
| RoT | ROM | Root Key |
| Global | FLASH/RAM | Boot Nonce |

FIG. 15

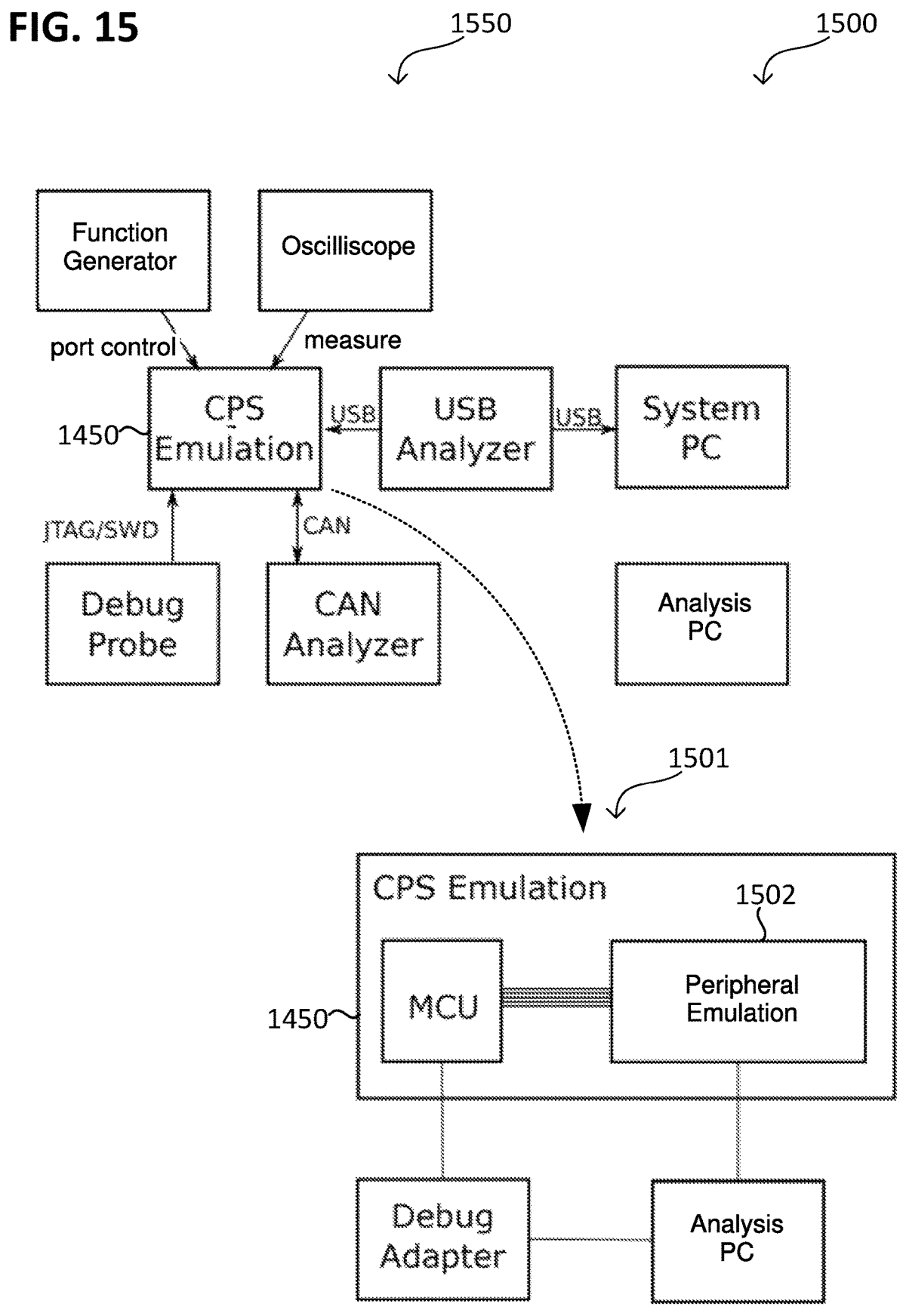

1550

1500

Function Generator

Oscilliscope port control measure

CPS Emulation

1450

USB

USB Analyzer

USB

System PC

JTAG/SWD

CAN

Debug Probe

CAN Analyzer

Analysis PC

1501

CPS Emulation

1502

MCU

Peripheral Emulation

1450

Debug Adapter

Analysis PC

FORENSICS MODULE AND EMBEDDED SYSTEM

Various embodiments relate to a forensics module, an embedded system and an automatic teller machine (ATM).

Critical infrastructures (CRITIS), such as communication, energy, transport or finance, are based on information technology systems (so-called IT systems). Components of these IT systems are, for example, routers, industrial control systems, medical devices or ATMs. U.S. Pat. No. 10,079,842 B1 describes a forensic service at block level to detect malicious activities on protocols. EP 3 798 883 A1 describes a digital forensics module that identifies forensics-specific metadata of the computing device from a plurality of system metadata of the computing device based on predetermined rules, wherein the forensics-specific metadata is used to detect suspicious digital activities.

With increasing digitalization, more and more control intelligence is being embedded in physical sensors and actuators, e.g. in a so-called cyber-physical system (CPS), which implements the networking of embedded systems through wired or wireless communication networks. Such a CPS (illustratively a network of IT and software components with mechanical and electronic parts that communicate via a data infrastructure, such as the Internet) consists of specialized hardware and embedded software. This embedded software is also referred to as firmware.

According to various embodiments, it has been illustratively recognized that the traditional view; wherein the firmware of an embedded system is granted an inherently higher level of security due to its low complexity compared to classic application software (e.g. PC software), reflects reality less and less. Due to this view; however, there are currently no protection concepts for firmware that include attack prevention, detection and investigation. This makes it easier for third parties, e.g. as part of professionally organized data crime, to carry out dedicated manipulation of the firmware. Coordinated manipulation of hardware, sensors and firmware is typical of such attacks.

Such targeted attacks (so-called "Advanced Persistent Threats") pose a high risk potential and, with it, the associated economic losses. While an attack on the firmware of a CAN bus controller in a vehicle may still be handled by a recall, such an attack in the regions of telecommunications, energy and health may have far more devastating consequences, e.g. on the security of supply for the population.

In this context, it was recognized that the prompt handling of such an attack to mitigate the consequences would be beneficial but difficult to manage conventionally, whether on the part of the manufacturer or the authorities. Such reconnaissance is particularly important for the prevention of future attacks. Conventional investigation techniques are difficult to apply directly due to the embedding of the firmware in the hardware. Furthermore, such an investigation also affects the conflicting interests of the parties involved, such as the operator, manufacturer and investigating authority, so that these parties have requirements that often conflict with each other. For example, the manufacturer has a great interest in protecting its company secrets, whereas the investigating authority wants to be informed as comprehensively as possible.

According to various embodiments, these circumstances and requirements are better taken into account. Among other things, it is provided that a forensic image of the suspected tampered firmware (also referred to as a firmware image) may be extracted and this firmware image may be emulated and examined in a suitable environment. The tampered firmware illustratively comprises the original firmware and additional malicious code.

Illustratively, according to various embodiments, a forensics module is provided by which an embedded system may be extended, for example, and which extracts the forensic image and provides it in such a way that the requirements of the parties involved are met as far as possible. In accordance with various embodiments, an emulation system for emulating an embedded system is provided, by means of which the forensic image may be examined as efficiently and authentically as possible.

According to various embodiments, the timely handling of an attack on an embedded system (EGS) is simplified, e.g. with greater efficiency and/or greater effectiveness. This improves the detection rate of such attacks and thus also makes it possible to improve crime prevention. This results in considerable potential for protecting critical infrastructures and thus increasing security of supply. It is also possible to improve police emergency response and increase crime prevention by gaining information more quickly and more effectively.

Efficient forensic extraction of the embedded firmware may involve extracting the suspected tampered firmware from the hardware with bit accuracy. Examination in an emulation environment may involve dynamically examining the extracted firmware and fully simulating the incident that triggered the extraction.

Shown is

Figure 2:
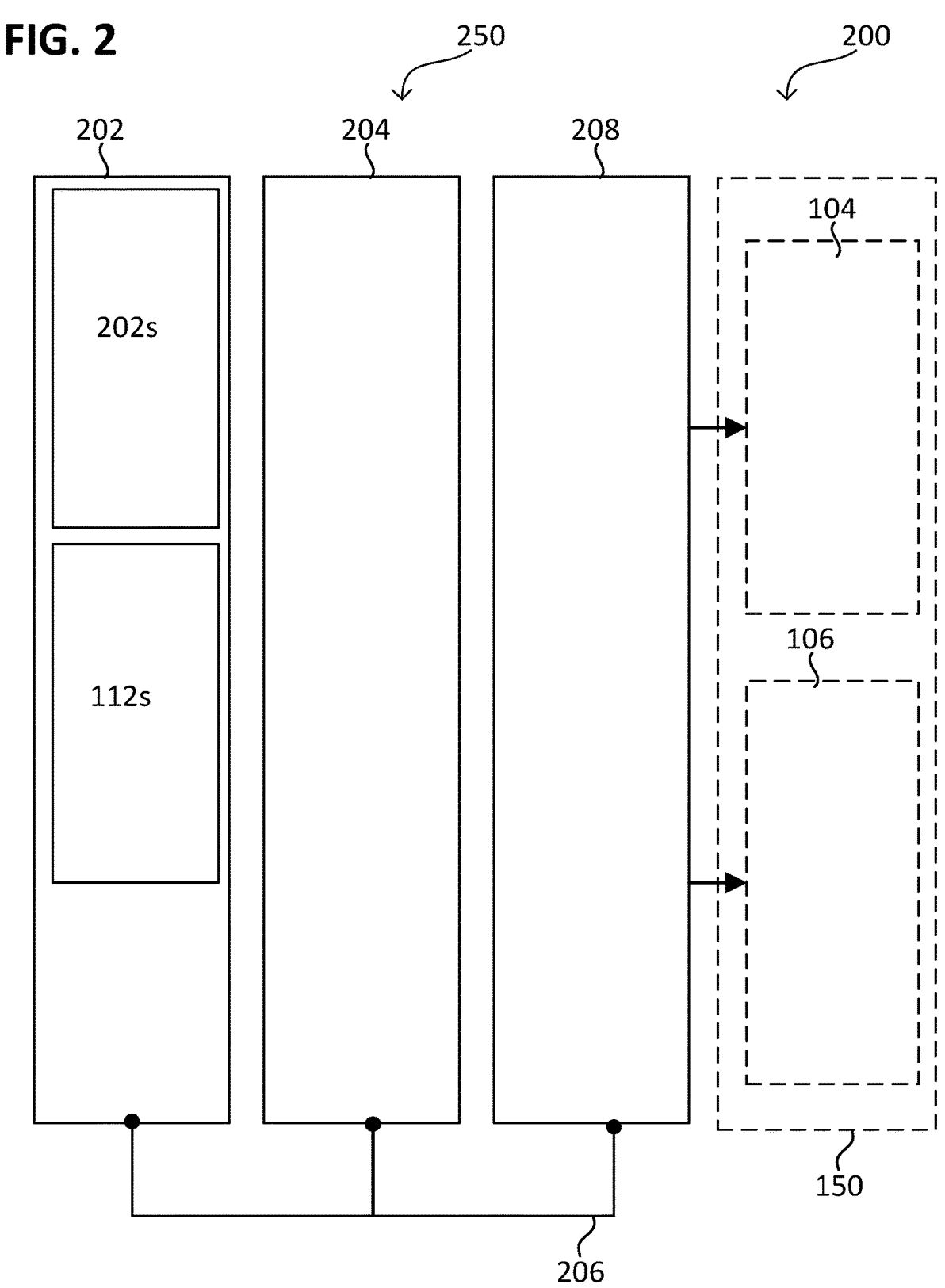
Figure 3:
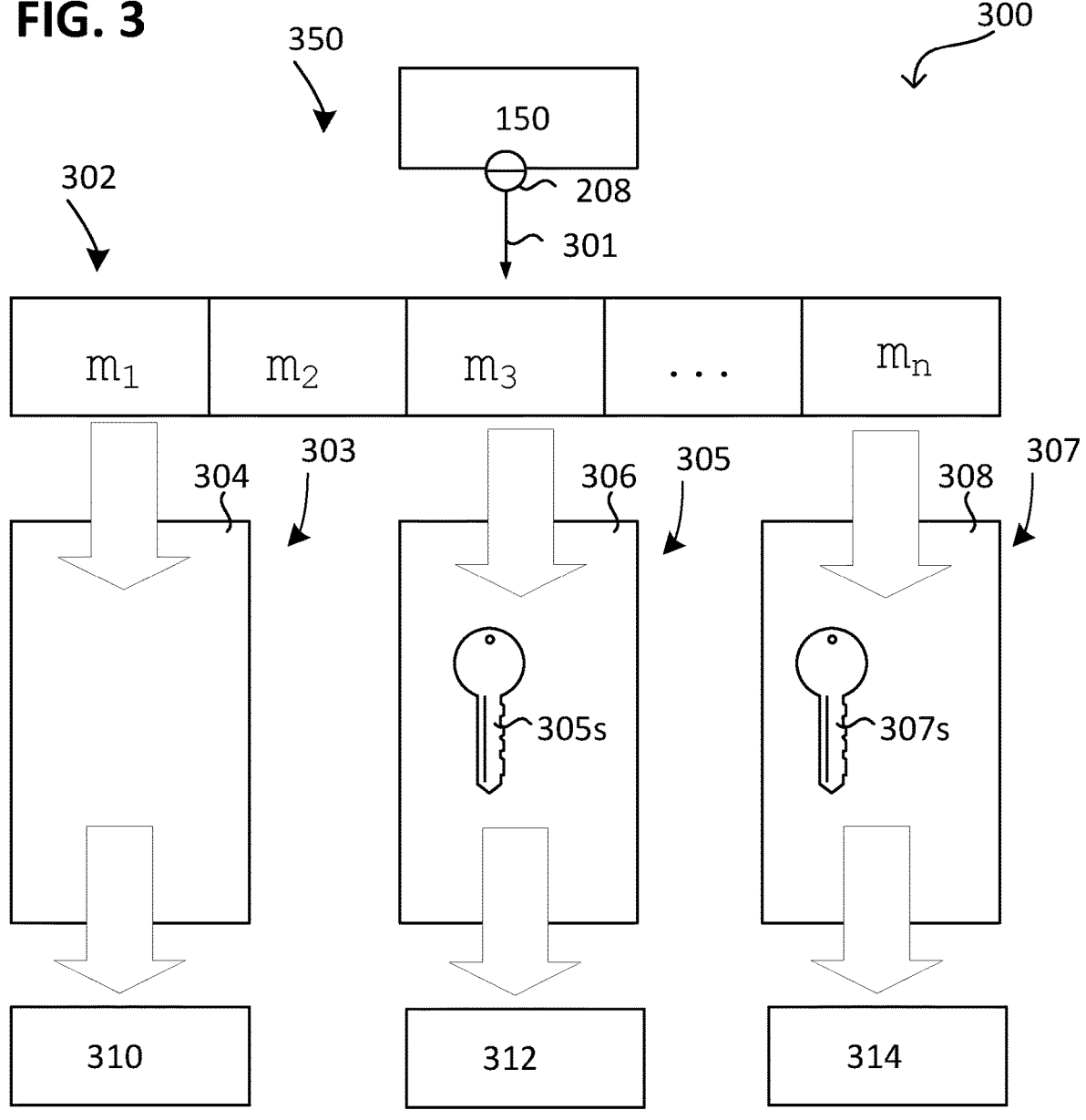
Figure 4:
Figure 5:
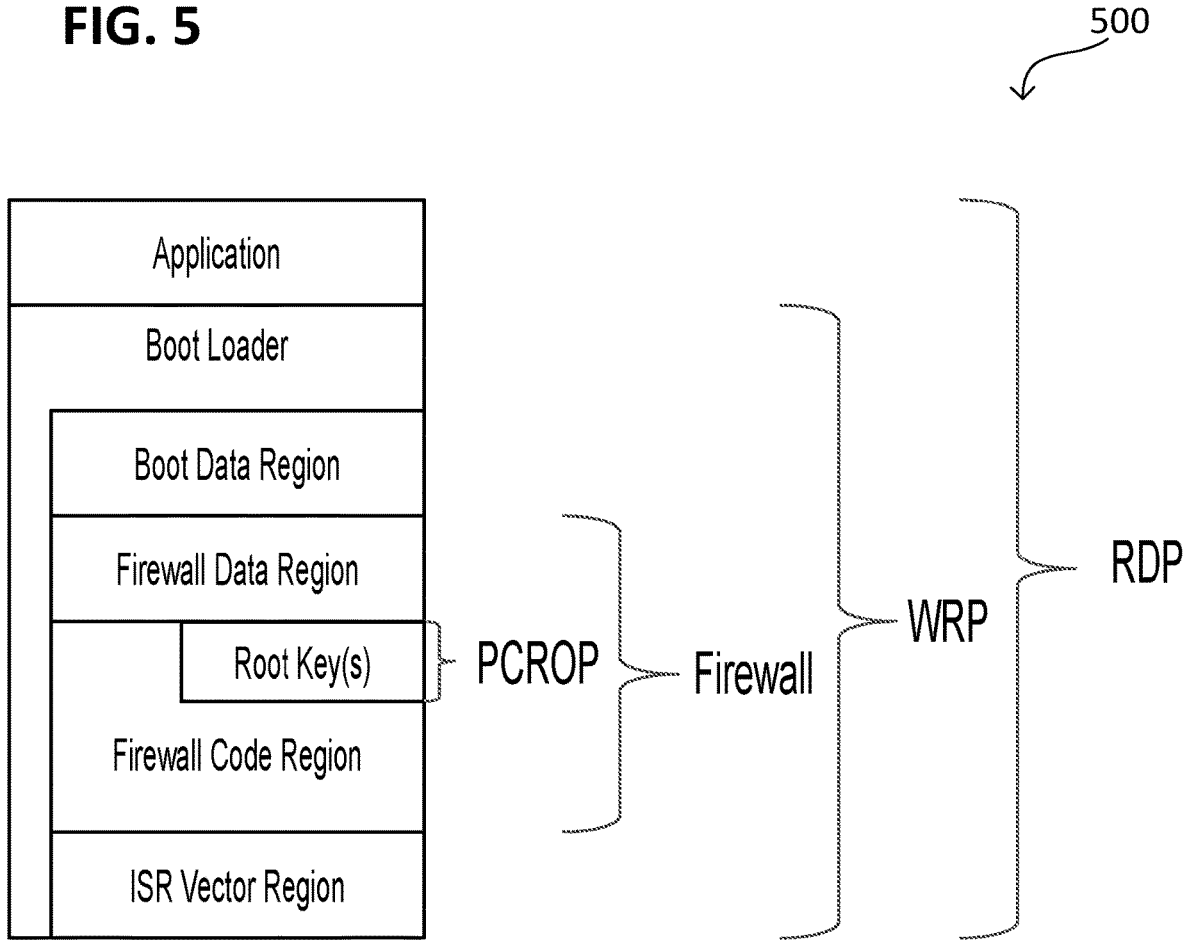
Figure 6:
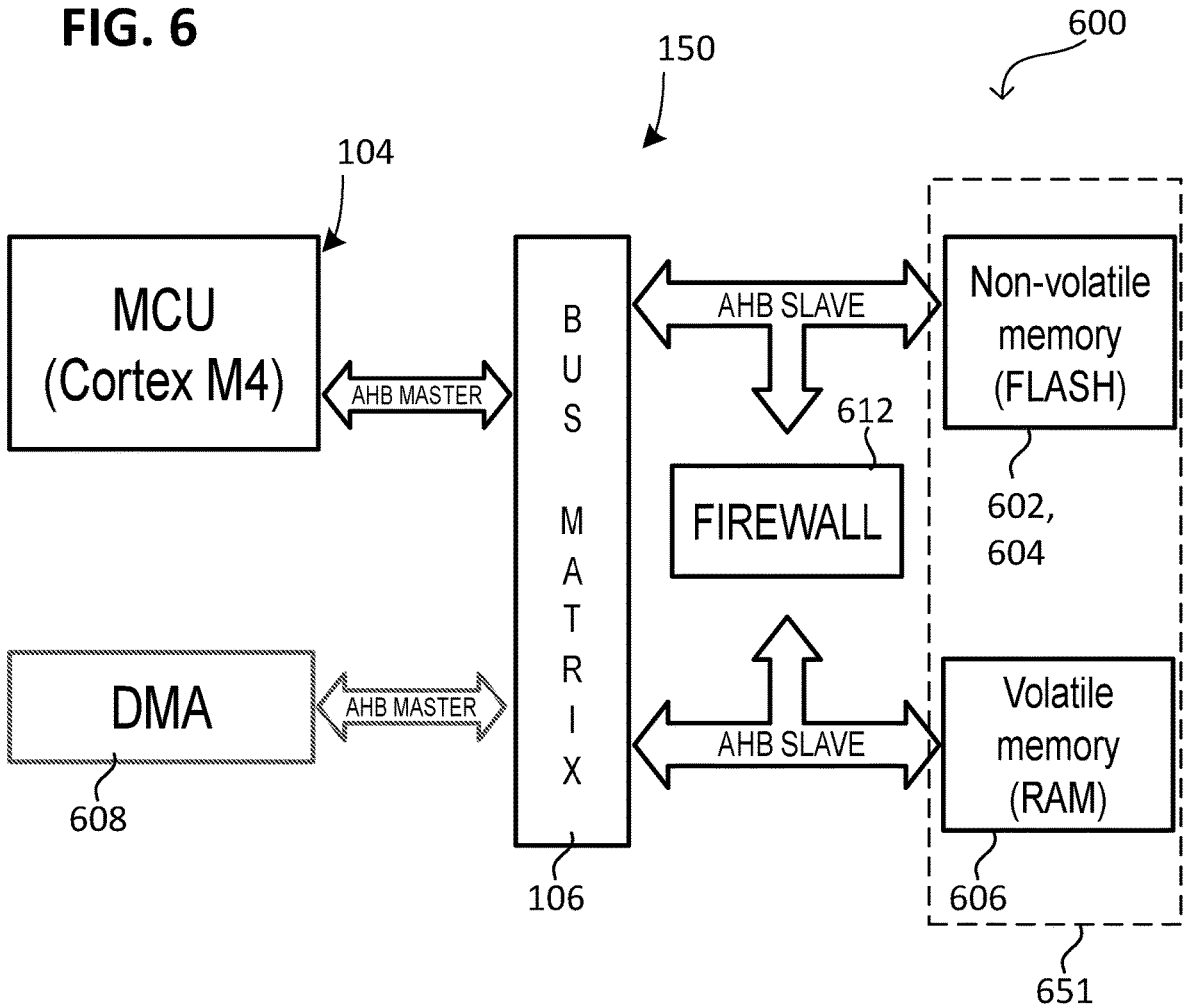
Figure 7:
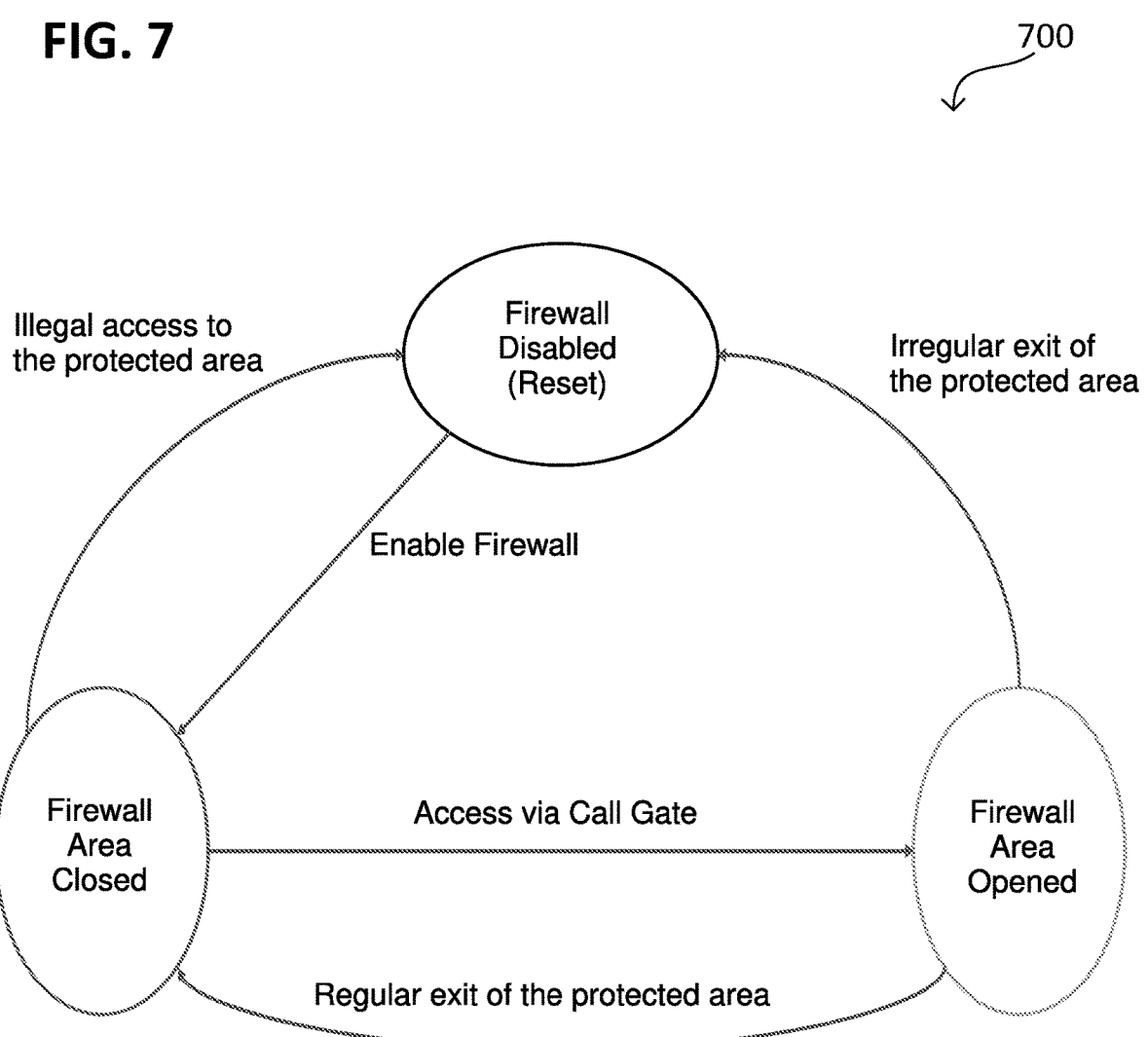
Figure 8:
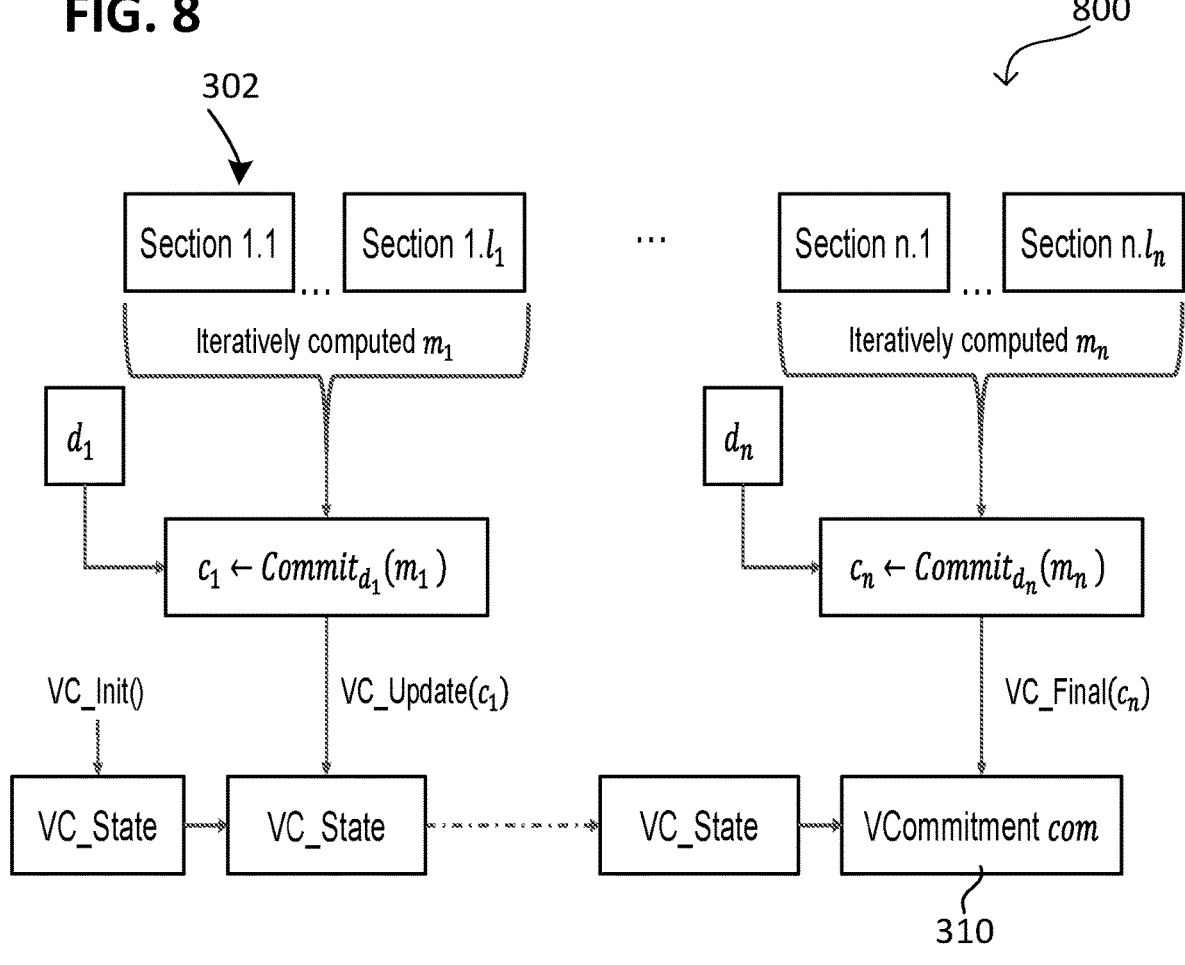
Figure 9:
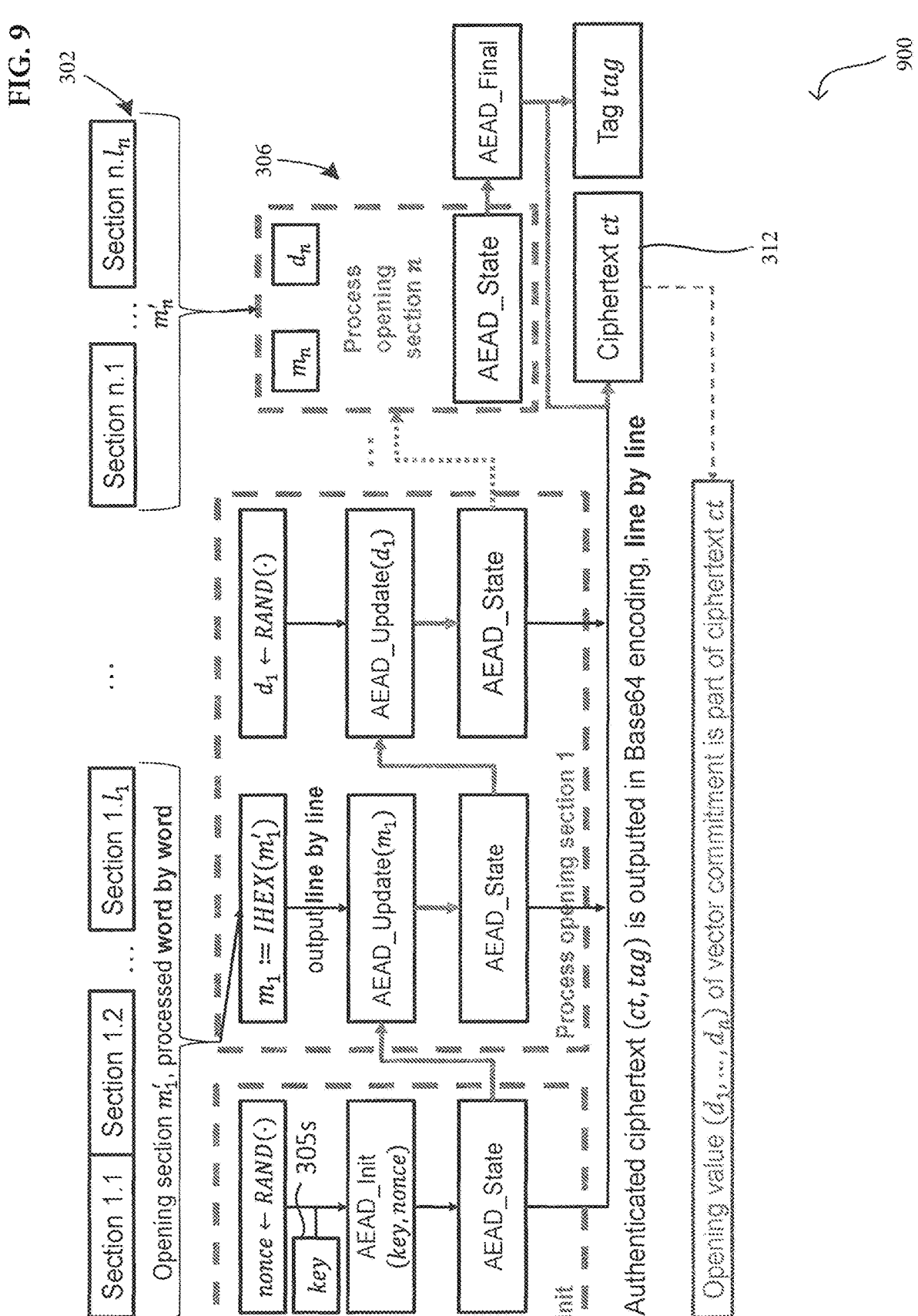
Figure 10:
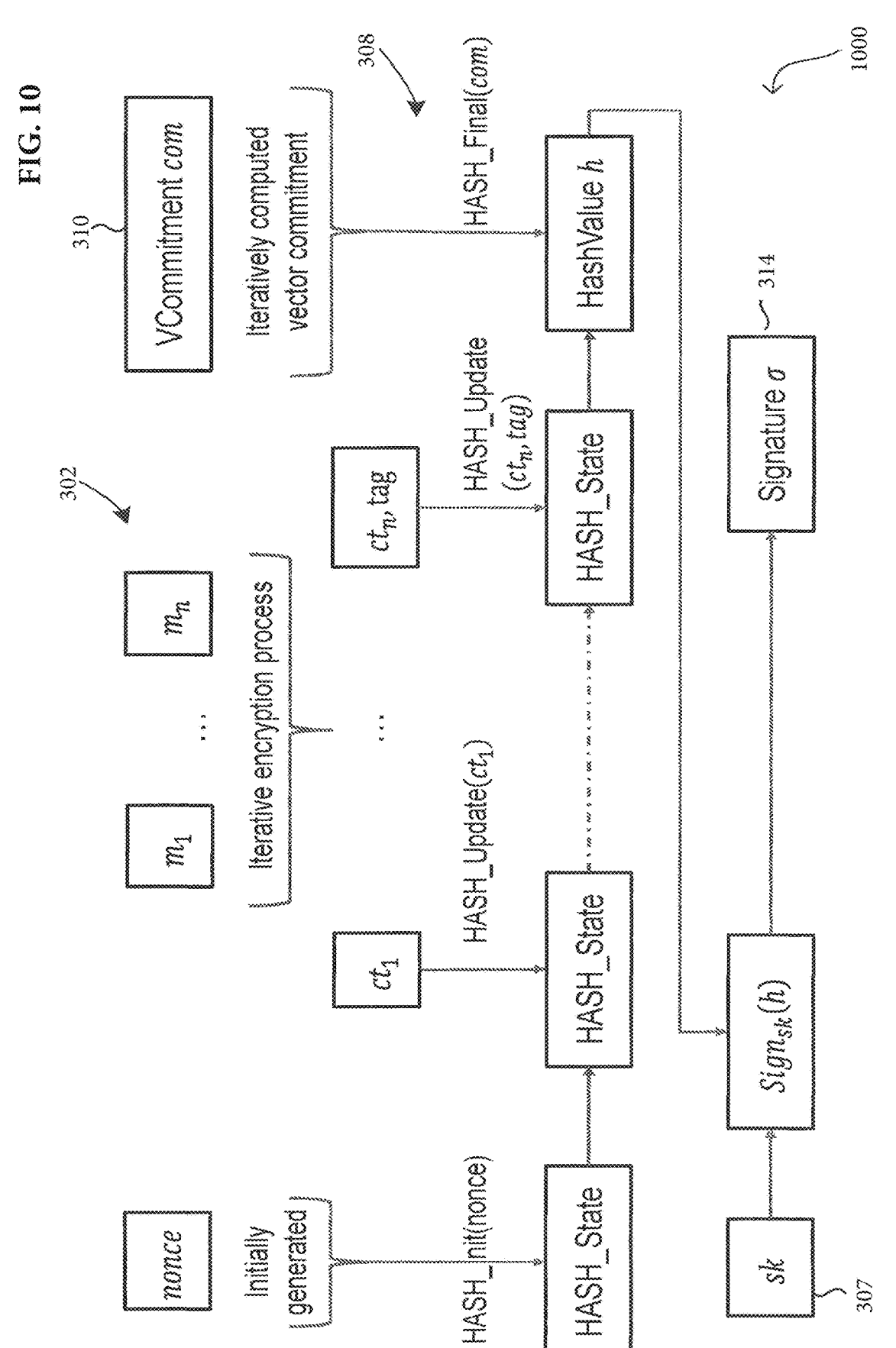
Figure 11:
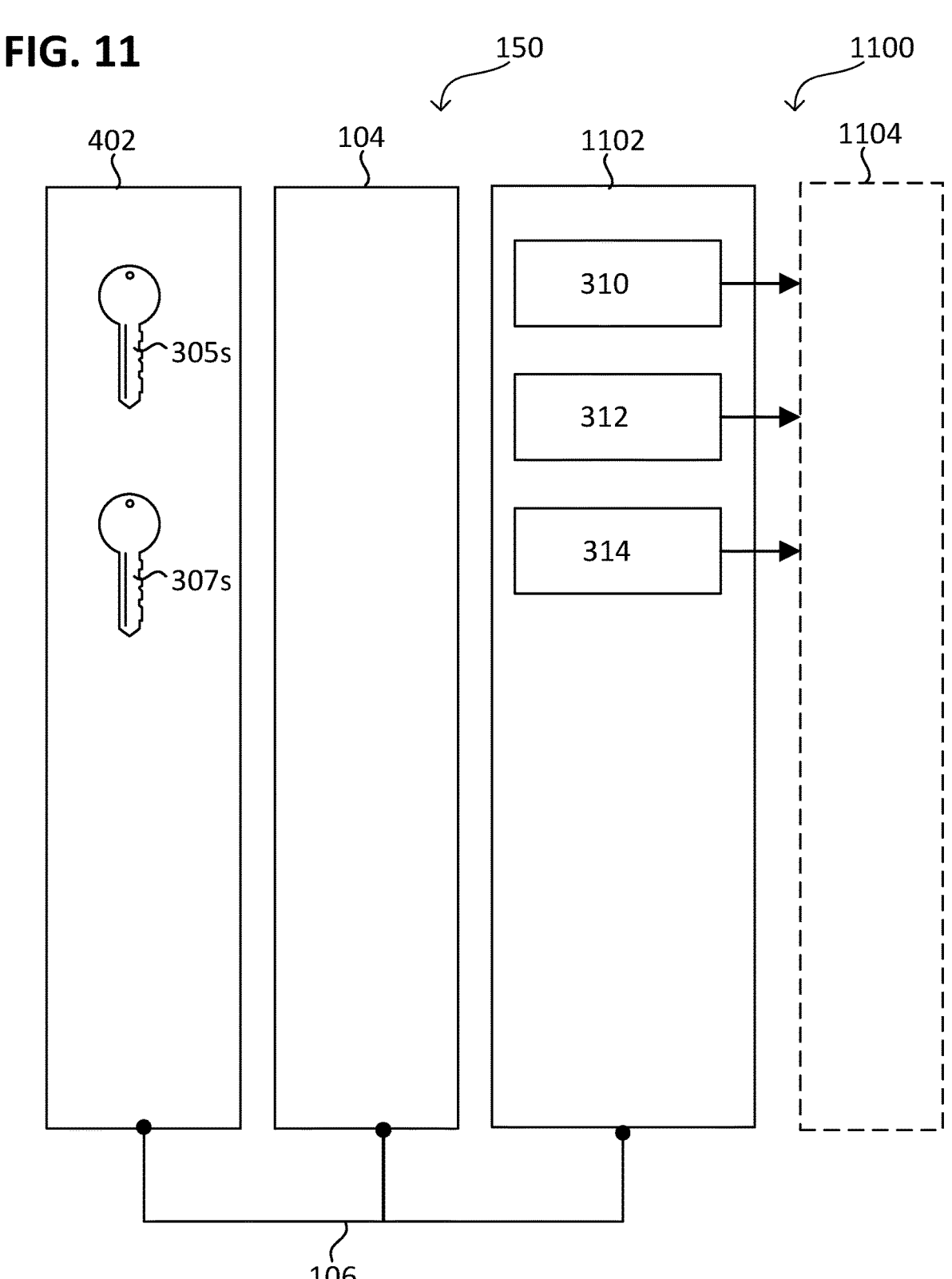
Figure 12:
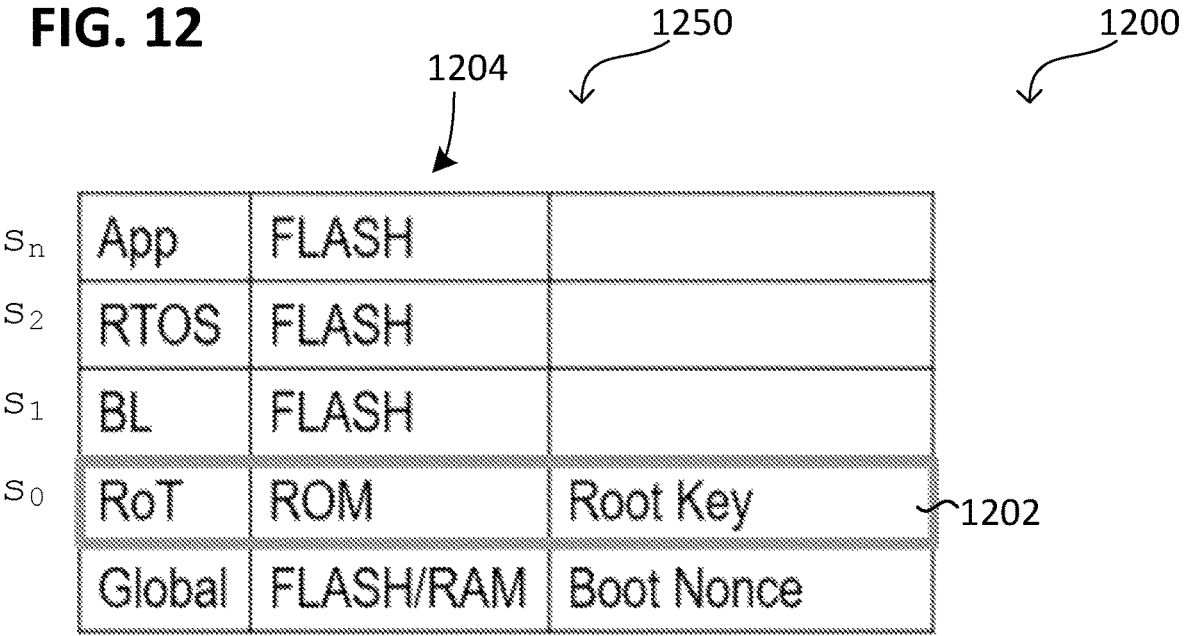
Figure 13:
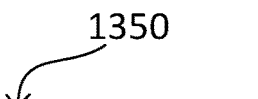
Figure 13:
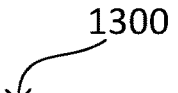
Figure 14:
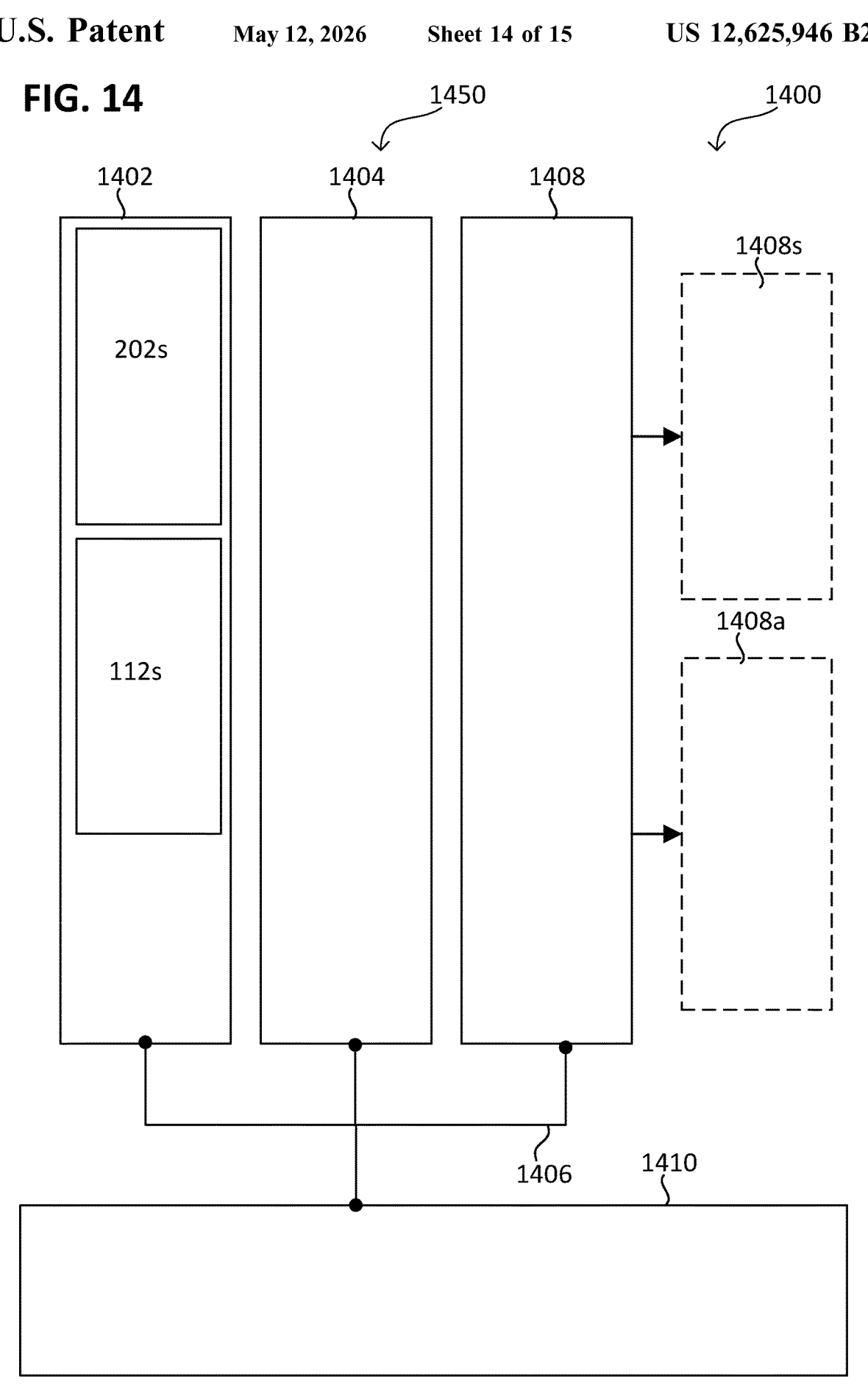

FIG. 1, an embedded system according to various embodiments in a schematic layout diagram;

FIG. 2, a forensics module according to various embodiments in a schematic layout diagram;

FIG. 3, the forensic extraction of the system state according to various embodiments in a schematic flow chart;

FIG. 4, a forensics module according to various embodiments in a schematic layout diagram;

FIG. 5, an exemplary implementation of the safeguarding mechanisms of the forensics module according to various embodiments in a schematic layout diagram;

FIG. 6, an exemplary implementation of the firewall of the forensics module according to various embodiments in a schematic layout diagram;

FIG. 7, a state diagram of a firewall according to various embodiments in a schematic flow chart;

FIG. 8, FIG. 9 and FIG. 10, each components of the forensic extraction according to different embodiments in a schematic flow chart;

FIG. 11, a forensics module according to various embodiments in a schematic layout diagram;

FIG. 12, a software stack of the embedded system according to various embodiments in a schematic layout diagram;

FIG. 13, the software stack of the system according to various embodiments in a schematic flow chart;

FIG. 14, a schematic diagram of an emulation system according to various embodiments; and FIG. 15, an analysis system according to various embodiments in different views.

In the following detailed description, reference is made to the accompanying drawings which form part thereof and in which specific embodiments in which the invention may be practiced are shown for illustrative purposes. In this regard, directional terminology such as "top", "bottom", "front", "rear", "forward", "rearward", etc. is used with reference to the orientation of the figure(s) described. Since components of embodiments may be positioned in a number of different orientations, the directional terminology is for illustrative purposes and is not limiting in any way. It is understood that other embodiments may be used and structural or logical changes may be made without departing from the scope of protection of the present invention. It is to be understood that the features of the various exemplary embodiments described herein may be combined with each other, unless specifically indicated otherwise. The following detailed description is therefore not to be construed in a limiting sense, and the scope of protection of the present invention is defined by the appended claims.

In the context of this description, the terms "connected", "attached" and "coupled" are used to describe both a direct and an indirect connection (e.g. ohmic and/or electrically conductive, e.g. an electrically conductive connection), a direct or indirect connection and a direct or indirect coupling. In the figures, identical or similar elements are provided with identical reference signs where this is appropriate. Several elements may, for example, be coupled together along an interaction chain along which an interaction may be exchanged, e.g. a signal and/or electrical energy. According to various embodiments. "coupled" may be understood in the sense of a mechanical (e.g. bodily or physical) coupling, e.g. by means of a direct physical contact.

The state of an entity (e.g. a device, a system or an operation or process) may be understood as the totality of information that fully describes the variable (e.g. time-dependent) properties of the entity. The actual state of the entity may be understood as the state of the entity that is actually present or may be sensed at a point in time. The target state of the entity may be understood as the desired state, i.e. a presetting. Control may be understood as an intended influence on the current state (also referred to as the actual state) of the entity. The current state may be changed in accordance with the presetting (also referred to as target state), e.g. by changing one or more operating parameters (also referred to as manipulated variable) of the entity, e.g. by means of an actuator.

Reference is made herein to various information technology (e.g. data processing and/or data storage) components, such as processor, data storage, communication infrastructure (e.g. comprising or formed from a bus system or other network) and the like. The processor-external components of the EGS are also referred to as peripherals or peripheral components. Several data-processing and/or data-storing components may be coupled to each other by means of the communication infrastructure (e.g. by means of a corresponding interface of the component) and, for example, exchange data (e.g. a digital representation of information) with each other during operation (more generally also referred to as communicating).

The communicating may, for example, be message-based (i.e. based on messages) according to a communication protocol (e.g. a network communication protocol, also referred to as a network protocol for short). The communicating may comprise transmitting, or at least sending, or at least generating, a message comprising the data according to the communication protocol. The communication protocol may illustratively denote an agreement according to which the communicating takes place between two or more components. In its simplest form, the communication protocol may be defined as a set of rules that define the syntax, semantics and synchronization of data transmission. The communication protocol(s) used (e.g. one or more network protocols) may in principle be selected arbitrarily and may (but does not have to) be configured in accordance with the OSI (Open System Interconnect) reference model. Any protocols may also be used in the respective protocol layers.

For example, a fieldbus communication protocol may be used for communication via a fieldbus. For example, a USB communication protocol may be used for communication via a universal serial bus (USB). Of course, another communication protocol may also be used, which may be proprietary, for example.

The interface coupled to the communication infrastructure may be configured to transmit the data according to the communication protocol, for example to transmit, or at least send, or at least generate a message comprising the data according to the communication protocol.

According to various embodiments, an internal system bus system may be configured to provide communication between the components of an EGS. The system-internal bus system may, for example, comprise a processor-internal bus and a processor-external bus.

According to various embodiments, the system-internal bus system may comprise or be formed from a fieldbus. The fieldbus may be configured as a network for distributed real-time communication, e.g. via a message-based communication protocol. The sequence and priority of a plurality of messages sent and/or received via the fieldbus is defined by the fieldbus communication protocol. Such a fieldbus communication protocol may be configured for distributed real-time control, e.g. standardized as International Electrotechnical Commission (IEC) 61158 (title "Digital data communications for measurement and control—Fieldbus for use in industrial control systems", e.g. in the version of May 2, 2017).

The EGS may communicate with other components by means of a system-external network, if available. A system-external network described herein may, for example, be distinguished by range, comprise or be formed from a local area network (such as a local area network (LAN), a wireless LAN (WLAN), or a personal area network (PAN), such as a wireless PAN (WPAN), such as a Bluetooth network) or a non-local area network (such as a metropolitan area network (MAN), a wide area network (WAN) or a global area network (GAN)). For example, the network may comprise or be formed from a radio network (also referred to as a wireless network), such as a cellular network, or a wired network, differentiated by transmission type. For example, the network may also comprise or be formed from a cellular radio network (e.g. an IEEE 802.11 type WLAN in ad hoc mode, a Bluetooth network or other cellular mobile radio network), for example according to a third generation (3G), fourth generation (4G), fifth generation (5G) or LTE (also referred to as 3.9G) mobile radio standard. The network may also comprise several interconnected sub-networks of different types.

According to various embodiments, the term "processor" may be understood as any type of entity that allows processing of data or (e.g., data-representing) signals. For example, the data or signals may be handled according to at least one (i.e., one or more than one) specific function performed by the processor. Examples of components of a processor comprise: an analog circuit, a digital circuit, a mixed signal circuit, a logic circuit, a microprocessor (e.g., in ARM architecture), a central processing unit (CPU), a graphics processing unit (GPU), a digital signal processor (DSP), a programmable gate array (FPGA), an integrated circuit, or any combination thereof. A microprocessor in ARM architecture is also referred to herein as an ARM processor or ARM for short. Any other type of implementation of the respective functions, which are described in more detail below; may also be understood as a processor or logic circuit. It will be understood that one or more of the processes and/or operations described in detail herein may be performed (e.g., realized) by a processor, through one or more specific functions performed by the processor. Similarly, a process and/or operation described herein may be implemented by means of code segments which, when executed by the processor, are configured to cause the processor to execute the process and/or operation.

According to various embodiments, a data storage device (also referred to as a storage medium or memory for short) may be a volatile or non-volatile data storage device. Examples of a non-volatile data memory comprise or are formed from: a hard disk, a semiconductor memory, such as a read-only memory, a non-volatile random access memory (also referred to as NVRAM—"non-volatile random access memory") and/or a flash memory (also referred to as flash for short). The read-only memory (also referred to as ROM) may be, for example, a programmable ROM or an erasable programmable ROM (may also be referred to as EPROM). The volatile data memory may, for example, be a transitory (volatile) random access memory.

In the context of a cryptographic process (e.g. encryption or signing), a cryptographic key (also referred to simply as a key) is information (e.g. a character string) that parameterizes the cryptographic process (e.g. its algorithm) and thus influences its output (e.g. independently of the input).

According to various embodiments, a sensor may be understood as a component that is configured to capture a physical quantity (also referred to as a measured quantity) of its environment, e.g. an actual operating parameter of a system or process as a measured quantity. The sensor may, for example, be part of a measurement chain comprising a corresponding infrastructure (e.g. processor, storage medium and/or bus system or similar). The measuring chain may be configured to control the corresponding sensor, process its captured measured variable as an input variable and, based on this, provide an electrical signal as an output variable that represents the actual state of the input variable at the time of capture. The measurement chain may be or be implemented using an embedded system, for example.

An actuator may be understood as a component that is configured to influence a physical variable (also referred to as a manipulated variable) in its environment, e.g. the manipulated variable of a system or process. The actuator may, for example, be part of a control chain comprising a corresponding infrastructure (e.g. processor, storage medium and/or bus system or the like). The control chain may be configured to process instructions that represent a target state of the manipulated variable as an input variable and, based on this, to control the actuator, which influences the actual state of the manipulated variable in accordance with the target state. The actuator may be controlled by means of an electrical signal (also known as a control signal). The control chain may be or be implemented using an embedded system, for example.

The controller may, for example, comprise an actuator (also referred to as an actor). The actuator may be configured to generate a mechanical movement (e.g. translation, rotation or vibration, e.g. sound) or otherwise mechanically influence its environment. For example, the actuator, e.g. an electromechanical converter, may be configured to convert electrical energy into mechanical energy (e.g. through movement) in response to controlling. Other types of actuators may also be configured to provide a voltage, a current, a frequency, radiation (e.g. light), a field (e.g. magnetic field) or similar according to the target state in response to controlling.

The term "embedded system" may be understood as an electronic computing device (also referred to as a computer) that is embedded (e.g., integrated) in a technical context, e.g., configured to provide one or more than one function in the technical context (also referred to as a technical function). Examples of the technical function comprise: a monitoring function, a control function, and/or a control function (in which the output of the monitoring function is fed as input to the control function), data conversion function (or signal conversion function). The monitoring function may be implemented using a measurement chain, for example. The control function may be implemented using a control chain, for example.

Examples of devices comprising one or more than one embedded (e.g., ARM-based) system include: a high-security smart card, a bitcoin wallet, an ATM, a self-encrypting hard disk, a plant control device, supply device (e.g., for power or water supply), and/or a vehicle (e.g., automobile or drone), e.g., an automobile control device. An exemplary implementation of an embedded system is an ARM-based system (e.g., comprising one or more than one ARM processor), e.g., an ARM-based control device. An ARM-based EGS makes it possible to combine a standardized processor core on a chip with application-specific peripheral blocks.

Exemplary components of an ATM comprising an EGS, e.g. whose operation is controlled thereby, include: a reading device (e.g. for reading an RFID chip, a credit card, a smart card or the like), a printer, a camera, a network device (e.g. a network card), a transport device (e.g. for transporting banknotes or other documents of value), a cash cassette (e.g. for receiving banknotes or other documents of value), a validation device (e.g. in an ATM), a withdrawal device (e.g. for withdrawing banknotes or other documents of value from an ATM), a deposit device (e.g. for depositing banknotes or other documents of value in an ATM), a user interface (e.g. comprising a pin pad, a keyboard, a touch screen or the like), e.g. an encrypting PIN keypad.

The EGS may comprise one or more than one interface configured according to the technical function (also referred to as a functional interface), for example configured to communicate according to a corresponding communication protocol. The functional interface may, for example, be configured to communicate via bus, e.g. CAN bus or LIN bus (also referred to as Local Interconnect Network bus), ZigBee for wireless communication or IP via Ethernet. The functional interface may, for example, be configured to communicate with a sensor and/or an actuator, e.g. to control it.

Among other things, reference is made herein to an embedded system as part of a cyber-physical system (CPS). It may be understood that the aspects explained with regard to a CPS may apply by analogy to the individually provided embedded system and vice versa. Illustratively, the CPS refers to the combination of IT and software components with mechanical and electronic parts that communicate with each other via a communication infrastructure.

According to various embodiments, reference is made to data (also referred to as state data) representing a system state of the embedded system. The state data may comprise or at least represent information from one or more than one (e.g., processor-internal and/or processor-external) memory area of the embedded system, such as the data contained therein. The processor-internal memory area may, for example, comprise or be formed from a register of a processor (also referred to as a processor register). For example, the state data may comprise an image of the data stored by the EGS (e.g. a memory image or a firmware image) or at least a representation thereof.

For ease of understanding, reference is made herein to various simplified terms for the parties concerned, including: the manufacturer of the EGS or CPS (also referred to as the manufacturer): the operator of the EGS CPS (also referred to as the operator): the manufacturer software of the EGS or CPS (also referred to as the firmware): the operator's network (also referred to as the network for short) by which the EGS or CPS is integrated into the operator's infrastructure: the investigating authority (also referred to as investigator) investigating an attack on the firmware and attempting to secure evidence for use in court: a fraudulent party (also referred to as attacker), e.g. a person or organization, who manipulates or at least attempts to manipulate the firmware of the embedded system or CPS. The manipulated firmware may be configured to operate the embedded system or CPS in a malicious manner outside of its manufacturer's intended mode of operation (also referred to as maliciously manipulated), e.g. to the detriment of the operator, the user and/or the manufacturer. The maliciously manipulated firmware may, for example, give the attacker at least partial access to data and/or the mode of operation of the embedded system or CPS. Additional examples of manipulated firmware enable the attacker to: manipulate the program sequence, introduce their own functionality, output data from this environment, read and/or change data on the way from the CPS to the manufacturer, and/or selectively view and manipulate data at the manufacturer before passing it on to the investigator.

According to various embodiments, a forensics module is provided which preserves the requirements of the parties involved as far as possible and still enables the system state of the EGS or the manipulated firmware to be forensically extracted as accurately as possible. The forensics module according to various embodiments prevents the operator, among other things, from subverting the forensic extraction of the system state and thus from acting as an attacker himself. For example, the operator is prevented from gaining insight into confidential data of the CPS to which he normally has no access, such as the manufacturer's IP. For example, the operator is prevented from manipulating extracted data, e.g. to avert liability claims. Such a fraudulent operator corresponds to an attacker who may read and change data on the way from the embedded system to the manufacturer.

The forensics module according to various embodiments also prevents the manufacturer from acting as an attacker, e.g. as an attacker on the authenticity of the status data. For example, the manufacturer is prevented from manipulating the status data before it is passed on to the investigator, for example to avert liability claims. For example, the manufacturer is prevented from transmitting data to the investigator that has not been extracted from the embedded system or from falsifying the system status in any other way.

FIG. 1 illustrates an embedded system 150 (EGS) according to various embodiments 100 in a schematic layout diagram, comprising at least one (i.e., one or more than one) processor 104 (also referred to as embedded processor 104) and one or more than one processor-external component (also referred to as peripheral component). For example, the EGS 150 may comprise or be formed from a microcontroller.

Examples of peripheral components of the embedded system 150 include: a memory device 102 (e.g., comprising one or more than one data memory 102s, 112s or memory area 102s, 112s), at least one (e.g., physical) interface 108, and a communication infrastructure 106, e.g., comprising a bus system, e.g., an "advanced high performance bus" (AHB). The communication infrastructure 106 may couple at least one or more than one peripheral component (e.g., memory device 102 and/or interface 108) to the embedded processor 104.

For example, the EGS 150 (e.g., its storage device 102) may comprise a trusted storage area (also referred to as a secured storage area) and a non-trusted storage area, which are separated from each other (e.g., physically, with respect to their address and/or by security mechanism).

The firmware of the embedded system 150 may be stored on the memory device 102, for example at least partially on the untrusted memory area (then also referred to as the untrusted portion of the firmware).

The at least one (e.g. physical) interface 108 (also referred to as a functional interface) may be configured to control (e.g. communicate with) at least one sensor 110 and/or at least one actuator 112, for example by means of a bus system 108b.

For example, the embedded system 150 may be configured to implement one or more than one technical function using the functional interface 108, such as for an ATM (also referred to as a cash machine). Examples of the technical function of an ATM include: Accepting and/or dispensing documents (e.g., cash): reading a smart card: receiving authentication information from a user (e.g., for a pin entry device), transporting documents within the ATM, storing and/or retrieving documents to/from a vault (e.g., a cash box disposed therein) of the ATM, and the like.

The embedded processor 104 may comprise or be formed from, for example, one or more than one ARM processor. The embedded processor 104 may comprise or be formed from, for example, one or more than one microprocessor.

According to various embodiments, a cyber-physical system (CPS) may comprise the embedded system 150 (or at least the embedded processor 104) and the at least one sensor 110 and/or at least one actuator 112. Optionally, the CPS may comprise an additional interface (also referred to as a networking interface). For example, the networking interface may be configured to communicate according to a communication protocol of the Internet protocol family (then also referred to as Internet communication protocol), for example from the TCP/IP protocol family.

In an exemplary implementation, the CPS comprises: at least one physical sensor 110 and/or at least one physical actuator 112, one or more than one optional bus system 108b (e.g., comprising a CAN bus), and one or more than one microcontroller (also referred to as an MCU) as a component of the embedded system 150. For example, the at least one physical sensor 110 is connected to the MCU directly or via the physical bus system 108b as an interface. Optionally, several MCUs of the EGS 150 may be coupled to each other by means of the bus system 108b and and/or integrated into the infrastructure of the operator by means of the networking interface. e.g. connected to a network (e.g. the Internet).

An MCU may comprise the at least one processor 104 (e.g., comprising one or more than one CPU and optionally one or more than one co-processor), a volatile data memory 102s (e.g., RAM), a non-volatile data memory 112s (e.g., flash, ROM), and one or more than one additional peripheral component 106, 108. Each peripheral component configured as an interface 108 may couple the MCU to the at least one of the sensor or actuator and/or be addressable via a register, which is mapped into the address range of the MCU.

An attack on the CPS may involve the attacker manipulating the untrusted part of the firmware of the CPS after commissioning. If a manipulation of the firmware of an embedded system 150 is detected, it is advantageous for a further investigation to extract this manipulated firmware verifiably (e.g. bit-accurately and/or completely). Traditionally, the interfaces in question are deactivated in a safety-critical environment in order to prevent an attack via them. The detection of a malicious manipulation of the firmware of an embedded component from the outside is therefore conventionally very complex and usually ambiguous in what it says. Conventional concepts for detecting external manipulation of the firmware are based solely on measurements of power consumption or the timing behavior of the embedded system. Alternatively, a forensic scientist could invasively read the firmware by mechanically opening the chip. This may require detailed knowledge of the chip, for example netlists, the placement of subcomponents such as memory and crypto modules and their physical wiring (routing) through so-called reverse engineering. However, all of these concepts require an expansion of the embedded component and therefore do not allow efficient investigation, especially during operation. Due to the complexity of today's embedded systems, for example in the case of a standalone complex operating system (e.g. Android) and/or proprietary software in the order of several megabytes, this may only be handled manually. For example, such manual concepts would have to be adapted to the respective hardware architecture by trained specialists. Due to the further development of chip technology, the structure sizes are becoming smaller and smaller, the security mechanisms more and more complex and the system structure more compact. Reverse engineering is therefore time-consuming, difficult to parallelize and requires very expensive equipment in a special laboratory. In particular, these processes lead to the destruction of the hardware under investigation.

According to various embodiments, a forensics module is provided which enables, for example, bit-accurate extraction of the firmware of the embedded system 150 for forensic investigations. The forensics module may comprise a dedicated interface for reading the firmware or other data of the embedded system 150. Further, the forensics module may implement one or more protection mechanisms (also referred to as safeguarding mechanisms) that inhibit misuse of this interface, for example based on cryptographic authentication mechanisms.

FIG. 2 illustrates the forensics module 250 (also referred to as the extraction module) according to various embodiments 200 in a schematic assembly diagram, which may for example be at least partially integrated into the embedded system 150 according to embodiments 100.

The forensics module 250 comprises: at least one memory area 202 (e.g., comprising a secure memory area 202s and/or a non-secure memory area 212s), at least one (i.e., one or more than one) processor 204 (also referred to as a forensics processor 204), a communication infrastructure 206. The communication infrastructure 206 may couple at least the at least one memory area 202 and the forensics processor 204.

The forensics module 250 further comprises at least one interface 208 (also referred to as a forensics interface 208) configured to communicate with the embedded system 150 (e.g., components thereof), e.g., with the at least one embedded processor 104 and/or with the memory device 102 of the embedded system 150. The communication with the embedded system 150 using the forensic interface 208 may, for example, be privileged to penetrate one or more than one protection mechanism of the embedded system 150.

Reference herein is made, inter alia, to a forensics module that is at least partially (i.e., partially or fully) integrated (e.g., via software) into an embedded system 150, such as where one or more than one component 102, 104, 108, 106 of the embedded system 150 is configured to additionally provide one or more than one aspect of the forensics module 250 or function and/or components thereof. For example, the forensics module 250 may be implemented at least in part as standalone firmware or at least as program code (also referred to as forensics code) that is, for example, integrated into the firmware of the embedded system 150, stored in the memory device 102 of the embedded system, and/or executed by the at least one processor 104 of the embedded system 150. For example, one or more than one memory area of the forensics module may be provided in the memory device 102 of the embedded system 150. For example, the functions of the or each forensics processor 204 may be provided by means of the at least one embedded processor 104 of the embedded system 150, such as when it executes the forensics code. The forensics interface 208 may be or may be provided by hardware and/or by software. For example, the forensics interface 208 may be provided using a communication protocol.

It may be understood that the aspects and/or functions and/or components of the integrated forensics module 250 explained with respect to the integrated forensics module 250 may be provided at least in part (i.e., partially or completely) as a (e.g., physically) standalone component (e.g., its memory area, forensics interface, and/or forensics processor), which may be retrofitted or added to an existing system architecture, for example. For example, the forensics interface 208 may comprise at least one physical data line, but does not necessarily have to, e.g., if it is implemented via software.

The at least one forensic processor 204 is configured (e.g., using code segments) to forensically extract data (also referred to as state data) representing a system state of the embedded system 150 or CPS, using the forensic interface 208 (also referred to as extraction for short).

The state data may represent (e.g., comprise) the contents (e.g., data) of one or each register of the at least one processor 104 (e.g., the or each CPU and optionally the or each co-processor) and/or the contents of the or each processor-external data memory 102s, 112s of the embedded system or CPS. For example, the state data may represent (e.g., comprise) the contents of RAM, flash, and CPU, co-processor, and peripheral registers.

Forensic extraction of tampered firmware may satisfy one or more of the following requirements to extract tampered firmware from hardware during operation:

Coordinated procedure: The manufacturer provides operators and investigators with a detailed description of how to proceed in the event of tampering, what information and data is to be secured, and what steps are to be taken to extract the firmware.

Confidentiality: Use of technical means to protect the manufacturer's company secrets (e.g. firmware IP) from unauthorized/unnecessary access, e.g. by the operator.

Authenticity: The manufacturer provides technical means to detect a subsequent change to the content and/or origin (identity of the hardware unit) of the extracted data (e.g. the manipulated firmware). This may be possible not only for the manufacturer but also for the investigator.

Partial disclosure: Optionally, the manufacturer may also provide technical means to disclose only dedicated parts of the extracted system state while still ensuring authenticity.

The coordinated procedure ensures that no important information for the analysis is lost on site in the absence of the manufacturer. Confidentiality serves to protect the manufacturer's company secrets (e.g. intellectual property (IP)). This protection in turn forms the basis of trust for implementing further mechanisms to clarify the incident. Authenticity ensures that the image may be used as evidence for criminal prosecution and to clarify liability issues after the manufacturer has uncovered (e.g. disclosed) the image or parts of it. Partial disclosure allows the manufacturer to disclose only those parts of the extracted system state that are relevant to the attack. It should be noted that larger parts or even the complete system state may also be made available to the investigators in order to rule out fraud by the manufacturer in case of doubt. Partial disclosure may above all minimize the amount of data to be published in order to protect the manufacturer's company secrets (e.g. IP). A court may then rely on the analysis of the investigators who have a complete set of information and at the same time, for example, relevant parts of the malicious code (e.g. malware) may be made public while maintaining the authenticity of the data.

The forensic extraction of the system state may be configured to prevent the attacker from subverting the confidentiality, authenticity and/or availability of the extraction. For example, the malicious code (e.g. the malware) could be designed in such a way that confidential data of the CPS is output in connection with its extraction. Furthermore, the state of the CPS could be manipulated by the malicious code during extraction, for example to make analysis more difficult or to prevent it from being used in court. The malicious code could also attempt to prevent the extraction of the system state.

This forensic extraction of the system status will be discussed in more detail below.

FIG. 3 illustrates the forensic extraction 350 of the system state according to various embodiments 300 in a schematic flowchart, such as may be or may be implemented using the forensics module 250 (also referred to as extraction module 250) according to embodiments 200.

The forensic extraction 350 may be performed within the forensics module 250 and/or the embedded system 150, and may optionally be started (initiated) from outside the embedded system 150 (e.g., from a so-called extraction trigger). For example, the extraction trigger may be a party or a device, such as the investigator or another party. For example, the result of the extraction 350 may be output to the extraction trigger in response to the extraction trigger starting the extraction 350. Communication between the extraction trigger and the embedded system 150 may be performed using an interface (not shown, also known as an extraction interface) of the forensics module 250 configured for this purpose.

For example, the forensic extraction 350 may be started by freezing the embedded system 150, e.g. its system state. For this purpose, the embedded system 150 may be stopped.

The forensic extraction 350 may comprise, in 301, a (e.g., bit-accurate) readout of the state data 302 (e.g., comprising a memory map) using the forensic interface 208. For example, the state data may comprise one or more data sets $m_k$ (k=1 . . . n, n>1). The reading of the state data 302 of a processor register (e.g. CPU register) and/or peripheral register may be performed by means of a routine dependent on the architecture of the embedded system 150 (also referred to as an architecture-dependent routine), which is implemented, for example, by means of the forensics interface.

For example, the read state data 302 may be stored in a (e.g., secured) memory area of the forensics module 250, e.g., in the form of one or more than one file (also referred to as a state file).

Reading the state data 302 may comprise, for example, reading one or more than one processor register (e.g., of the CPU, also referred to as a CPU register). The reading of each processor register may comprise storing a memory image of the or each processor register in the (e.g., secured) memory area of the forensics module 250. This makes it possible to save the context of the running application immediately upon starting the forensic extraction 350. This makes it easier to extract the exact context of an application, including possible malware.

In an exemplary implementation, one or more than one CPU register of the EGS 150 may be read out. Each CPU register may be part of the system state of the EGS 150 (or CPS). During the execution of the malicious code, the CPU registers contain, in particular, information that could be of importance for further analysis. If the CPU register is not addressable (for example, in contrast to the rest of the memory), the readout may comprise one or more than one CPU register:

mapping (e.g. saving) each CPU register in a state file (then also referred to as a register file) within a reserved memory area of the forensics module 250; and reading-out of the register file as part of the remaining readout of the memory of the forensics module 250 or embedded system 150.

In order to create an image that is as accurate as possible, it is best to avoid modifying any information in the untrusted memory area of the embedded system 150 (or CPS).

If the extraction 350 is triggered by means of an exception handling (also referred to as exception), the readout 301 of the system state may comprise the following:

placing the exception frame on the stack;

mapping of one or more than one CPU register in the register file of the forensics module 250;

setting the stack pointer (SP) in the memory area of the forensics module 250;

reading the memory of the embedded system 150 (e.g. including the register file); and restoring the stack pointer.

To fulfill one or more than one of the above requirements (authenticity, confidentiality, and/or partial disclosure), the state data 302 (e.g., a memory image of the embedded system 150) may be cryptographically processed prior to output (e.g., by the MCU), as discussed in more detail below.

The forensic extraction 350 may comprise, in 303, determining a commitment 310 (also referred to as a commitment indication) based on the state data 302 and using a cryptographic commitment process 304 (e.g., a vector commitment process). For example, the state data 302 may be mapped to the commitment 310 using the commitment process 304. An exemplary algorithm (also referred to as a commitment algorithm) for implementing the commitment process 304 will be described in more detail later.

The commitment process 304 may be configured in such a way that each data set $m_k$ may be verified individually, for example using the commitment and/or an opening value $d_k$ individually assigned to the data set $m_k$. This achieves the possibility of partial detection.

The forensic extraction 350 may comprise, in 305, encrypting (also referred to as encrypting 305) the state data 302 and the aperture values $d_k$ using a key 305s (e.g., symmetric key 305s). The result of the encryption 305 comprises data 312 (also referred to as ciphertext, crypto-gram, ciphertext or ciphertext) comprising the encrypted state data and optionally encrypted opening values $d_k$. The key 305s (also referred to as first key 305s or encryption key 305s) may be implemented using data (also referred to as key data or key-implementing data) in the secured memory area 202s of the forensics module, as will be explained in more detail later. Encryption 305 of the state data and optionally the opening values $d_k$ may be performed using a (e.g. symmetric) encryption process 306.

For example, the encryption process 306 may be an authenticated encryption process 306 that enables encryption and authentication of the state data using the encryption key 305s unique to the embedded system 150. For example, the encryption key 305s may be known (e.g., only) to the manufacturer.

The forensic extraction 350 may optionally comprise, in 307, a signing of the state data 302. The result of the signing 307 comprises the so-called signature 314 of the state data 302. Signing 307 may be performed, for example, using a signature process 308 and/or a (e.g., asymmetric) second key 307s (also referred to as a signature key or signing key). Signing the state data 302 enables a unique identifier of the state data 302 by means of the signature key 307s individual to the embedded system.

Encrypting 305 may favor confidentiality of the manufacturer's trade secrets (e.g., IP) as part of the system state to the operator and/or investigator. Nevertheless, the manufacturer may reveal the system state, for example, after signing a confidentiality agreement. Through the commitment 310, the embedded system (e.g. CPS) commits to the content of the state data 302, e.g. the encrypted memory image, at the time of extraction 350 (also referred to as extraction time). This allows the manufacturer, despite encryption 305, to later prove to the operator and/or investigator that the revealed system state corresponds to the previously extracted state data 302.

By using a vector-commitment process 304 (also referred to as a VC process), subsets (e.g., one or more than a single data set $m_k$) in particular may be detected, e.g., only the flash memory area if it contains the malicious code. The signature method together with the unique identifier of the state data 302 allows to prove that the state data 302 was created by the embedded system 150 at the time of extraction and was not subsequently modified (e.g. by the manufacturer). The functionality for decrypting, revealing and verifying the state data 302 is performed later by means of an emulation system (also referred to as a processing module), which will be described in more detail later.

The extraction module 250 (e.g., its forensics interface 208) implements a function for the extraction 350 that reads in the system state of the EGS 150 (e.g., CPS) and outputs the result of the extraction 350 via a suitable interface, e.g., the networking interface.

If the addresses read from the EGS 150 are relevant to the extraction 350 and are read as part of the system state, the state data 302 may be encoded in Intel Hex format (also referred to as IHEX encoding). The Intel Hex format is particularly simple and offers widespread support and readability. Furthermore, the Intel Hex format also allows the encoding of the state data 302 in the stream, which makes it easier to directly output the encoded and secured state data 302 in order to minimize memory requirements. From a logical point of view, the status data 302 after IHEX encoding is available as ASCII strings in this case. The status data formed in this way may, for example, be written as a vector m with n components $m=(m_1, \ldots, m_n)$. However, any other suitable encoding may of course also be used or the state data 302 does not necessarily have to be encoded.

It is advantageous if the size of the internal state of the extraction 350 is constant in the size of the extracted system state. This achieves a lower memory requirement of the extraction 350, which will be provided exclusively for the extraction 350 and avoids that the system state may only be extracted incompletely. This is favored by running two or more components 303, 305, 307 (e.g., comprising: determining 303 the commitment 310, encrypting 305 and/or signing 307) of the extraction 350 (e.g., cryptographic processes) in parallel. For example, the system state to be extracted, e.g. the state data 302, is processed iteratively word by word or at least data record by data record.

FIG. 4 illustrates the EGS 150 according to various embodiments 400 in a schematic layout diagram (for example configured according to embodiments 100), which may be transferred in particular to a plurality of embedded systems (or CPS), for example with regard to the implemented safeguarding mechanisms.

The basis of the forensics module 250 according to embodiments 400 is an STM32L4 MCU as part of the embedded system 150, at least one processor 104 of which comprises a Cortex-M4 CPU. The Cortex-M4 CPU comprises a 32-bit architecture for data and instructions. Registers and buses therefore have a width of 32 bits. The Cortex-M4 CPU further comprises a so-called thumb instruction set or implements a so-called thumb mode. In this thumb mode, a reduced instruction set, the so-called thumb instruction set, is available, in which only 16 bits are required for the coding of instructions.

The following table provides an overview of the processor registers of the Cortex-M4 CPU. The Cortex-M4 CPU has two stack pointers comprising the main stack pointer (MSP) and the process stack pointer (PSP) to which R13 may have access and may be may be controlled by means of a bit in the control register ("Control Register" or CONTROL for short). The program status register (so-called "Program Status Register" or PSR for short) comprises one or more of the following registers: an application program status register (so-called "Application Program Status Register" or APSR for short), an interrupt program status register (so-called "Interrupt Program Status Register" or IPSR for short), and/or an execution program status register (so-called "Execution Program Status Register" or EPSR for short).

| | Type | Access mode | Description |
|---|---|---|---|
| R0-R12 | read-write | all | General Purpose Register |
| MSP (R13) | read-write | privileged | Main Stack Pointer |
| PSP (R13) | read-write | all | Process Stack Pointer |
| LR (R14) | read-write | all | Link Register |
| PC (R15) | read-write | all | Program Counter |
| PSR | read-write | privileged | Program Status Register |
| APSR | read-write | all | Application Program Status Register |
| IPSR | read-only | privileged | Interrupt Program Status Register |
| EPSR | read-only | privileged | Execution Program Status Register |
| PRIMASK | read-write | privileged | Priority Mask Register |
| FAULTMASK | read-write | privileged | Fault Mask Register |
| BASEPRI | read-write | privileged | Base Priority Mask Register |
| CONTROL | read-write | privileged | Control Register |

The link register (so-called "Link Register" or LR for short) is used to store the return address when a function is called up. With the "BL" instruction, the CPU writes the current value of the program counter (PC for short) to the link register (LR) before jumping to the target address. This allows you to return to the value stored in the link register from the called function later by setting the program counter (the so-called "function return").

The Cortex-M4 CPU is either in thread mode (so-called "thread mode") or in handler mode (so-called "handler mode"). Exceptions are executed in handler mode (also known as exception handling). Execution in handler mode, for example, is always privileged. Other execution takes place in thread mode. Execution in thread mode, for example, may be either privileged or unprivileged. In unprivileged execution, the Cortex-M4 CPU cannot access all registers and memory areas (see table above). The change from thread mode to handler mode takes place by triggering an exception. Examples of exceptions include: an external interrupt, a timer interrupt and an access error. The supervisor call instruction (so-called "Supervisor Call Instruction" or SVC instruction) also triggers an exception and makes it possible to switch to handler mode via software. When entering an exception, the Cortex-M4 CPU automatically performs several steps comprising:

1. create an exception frame on the active stack (also referred to as stack).
2. place the LR on a special EXC_RETURN value.
3. context switch to handler mode.

The exception frame for the Cortex-M4 CPU is shown in the following table, which shows the Cortex-M4 stack frame when the exception is entered. The "Address Offset" column indicates the address offset relative to the value of the stack pointer (SP) before the exception is entered.

| Adress Offset | Register |
| --- | --- |
| −4 | PSR |
| −8 | PC |
| −12 | LR |
| −16 | R12 |
| −20 | R3 |
| −24 | R2 |
| −28 | R1 |
| −32 | R0 |

Accordingly, the registers R0-R3 and R12 in the exception handler may be overwritten, as these are reconstructed from the stack by the CPU when the handler exits.

The exception frame also comprises the value of the program counter before the exception was entered. This allows the CPU to place the program counter back to the state before the exception was entered at the end of the exception handler. To exit the exception handler, the program counter is set to the value EXEC_RETURN, which was in LR when the exception was entered. The EXEC_RETURN encodes information about the structure of the exception frame and the mode in which the exception is to be exited (handler mode or thread mode). This causes the CPU to exit the exception in the correct mode and restore the registers of the exception frame.

Various options for implementing the forensics module 250 in the embedded system 150 are explained below.

In order to meet the confidentiality and integrity requirements, one or more than one safeguarding mechanism is implemented which inhibits or prevents malicious code (e.g., a malware) from accessing a memory area of the embedded system 150 (e.g., CPS) that is safeguarded therewith. The embedded system 150 (e.g., its storage device 102) comprises a secured memory area 402 (also referred to as trusted memory area 402) and a non-secured memory area 404 (also referred to as untrusted memory area 404).

In general, the secured memory area 402 requires higher privileges (also referred to as permissions or authorization levels) to access it than the untrusted memory area 404. Hardware-based implementations of the trusted memory area 402, or its isolation from the untrusted memory area 404, include: a memory protection unit (the so-called "Memory Protection Unit" or MPU for short), a trusted runtime environment (the so-called "Trusted Execution Environment" or TEE for short), or a security element (the so-called "Secure Element" or SE for short).

In an EGS 150, the MPU is typically controlled by a real-time operating system (the so-called "Real Time Operating System" or RTOS for short). The RTOS implements access control to the memory and a separation of processes among each other and between the processes in thread mode and the RTOS in handler mode.

To use a TEE, all resources of the EGS 150 are divided into a secure and an insecure part. This makes it possible to isolate security-critical components, for example components with access to critical assets such as keys. The separation may also take place within the privileged RTOS. In this way, security-critical functionalities may be separated from the complex part of the RTOS. When using an SE, security-critical functionalities are outsourced to a completely separate piece of hardware, the SE. Examples comprising: a smart card or a trusted platform module (the so-called "Trusted Platform Module" or TPM for short). This offers a high level of isolation, but makes integration on the application MCU side more difficult.

In the following, reference is made to the implementation of the forensics module 250 in a TEE. Compared to implementation using the MPU, this has the advantage that the complex operating system controlling the MPU does not have to be located in the trusted part of the CPS from a forensics perspective. It may be understood that the aspects explained in this regard may apply by analogy to a different implementation of the forensics module 250 and are not necessarily limited to the TEE.

For the implementation of the trusted memory area 402, it may play a role whether it should only be entered once after system startup or whether it should be re-entered at runtime, which enables extraction at any time. Additional privileges may be granted for entry at runtime. This case places higher demands on the hardware for implementing the trusted memory area 402. The effects of re-entry on the functionality of the forensics module 250 are shown in the following table.

| | No Re-Entry | Re-Entry |
| --- | --- | --- |
| Detection | Only upon system startup, persistent manipulation, boot attestation | Anytime, persistent and transitory manipulation, remote general attestation |
| Extraction | Only upon system startup, persistent state | Anytime, overall state |

However, secure re-entry into the trusted memory area 402 places more demands on the hardware than entry via the restart, since the privileges must be elevated during the transition from the untrusted to the trusted memory area 402 during re-entry.

Since malicious code may be executed at the time of re-entry, it may be the case that forensic extraction 350 is executed in parallel with the malicious code. Otherwise, the attacker could subvert the availability of forensic extraction

350. Entry into the forensics module 250 (illustratively, the activation of the forensics module 250) is then carried out via an exception of sufficiently high priority. Examples of exceptions for starting (triggering) forensic extraction 350 include a timer: a timer as part of the root of the security chain (the so-called "root of trust" or ROT for short) may be used to periodically interrupt the malicious code and then, depending on possible further conditions, start extraction 350. The timer for starting extraction 350 is suitable, for example, if the operating system is part of the ROT, as the operating system usually gains control over the control flow through a timer interrupt.

External interrupt: An interrupt triggered by external events interrupts the malicious code. Here, too, it is helpful if the configuration of the interrupt is part of the RoT, so that masking by the attacker is inhibited (e.g. prevented). The external interrupt is suitable, for example, if the extraction is to be triggered by the environment of the embedded system 150 (or CPS), e.g. by pressing a button on the extraction trigger.

Fault handler (so-called "fault handler"): Extraction 350 may also be implemented as part of a fault handler. In this case, extraction 350 is triggered if the malicious code causes a fault (e.g. an error) that is not handled in any other way. The fault handler is also suitable if extraction 350 is to be used for general fault analysis.

In order to favor availability, each of these exceptions may be configured in such a way that the interrupt cannot be suppressed by the attacker. This may be achieved, for example, by means of a configuration of the embedded system 150 in which both the interrupt handler itself and the configuration of the interrupt controller are within the RoT. The specific implementation depends on the type and architecture of the respective embedded system 150 (or CPS), its MCU and the available access control mechanisms (so-called "access control mechanisms"). Possible concepts for implementation comprising: an ARM security zone (the so-called "Arm TrustZone"), the firewall or the MPU.

In a preferred, easy-to-implement implementation, extraction 350 is triggered by means of an external interrupt (illustratively an instruction to interrupt).

Various examples of the implementation of security mechanisms are explained below, which are, for example, static, i.e. are not necessarily configured at system startup of the embedded system 150:

Read protection (or RDP for short) protects data on an MCU against access from outside the system;

Proprietary code read-out protection (or PCROP for short) provides additional protection of the executable code against unintentional internal read-outs. For example, PCROP may be used to protect security-critical data, such as one or more than one cryptographic key;

Write protection (or WRP for short) protects a memory area from unwanted write access within the system.

The static protection mechanisms may, for example, be implemented in an interlocking manner and/or supplemented by one or more of the following dynamic protection mechanisms.

an MPU configured to isolate multiple memory areas from each other;

a firewall which is configured to implement a secure, e.g. encapsulated, environment (also referred to as an enclave), for example providing a secure storage area, in which particularly security-critical data, such as one or more than one cryptographic key, may be stored and/or critical functions may be executed on this data in isolation.

The so-called option bytes make it possible to configure one or more than one static protection mechanism of the EGS 150 (e.g. microcontroller). Both flash banks of the EGS 150 (e.g. microcontroller) each have 40 option bytes for this purpose. If the content of the option bytes is stored redundantly, only 20 bytes per flash bank may actually be used. The majority of the option bytes are not conventionally used.

The specific addresses of the individual registers are architecture-dependent and/or application-dependent. With regard to the following registers, the respective protection mechanisms will be discussed in more detail below. Let the index $x \in \{1,2\}$ represent flash bank 1 or 2. If the index x is omitted in the following, this setting should only apply to flash bank 1.

RDP (1 byte) enables write protection to be configured;

PCROPx_STRT and PCROPx_END (2 bytes each) make it possible to define one or more than one PCROP-secured memory region (also referred to as PCROP region);

PCROP_RDP (1 bit) specifies whether the PCROP region is deleted when the RDP level is reduced;

WRPxA_STRT, WRPxA_END and WRPxB_STRT, WRPxB_END (1 byte each) make it possible to specify two regions per flash bank that are protected from write access.

BOOT0 and BOOT1 bits together indicate the boot mode.

According to various embodiments, it is provided that the option bytes may no longer be changed when RDP level 2 is switched on, not even by the application on the MCU. The firewall does not necessarily belong to the static security mechanisms and is not configured or switched on via the option bytes.

According to various embodiments, the embedded system 150, e.g., its processor 104, is configured (e.g., as one of the first steps) to verify (also referred to as a security check) the configuration of the (e.g., static) security mechanisms. The security check may comprise determining whether the option bytes fulfill a stored presetting (as discussed below) and optionally (e.g., if the presetting is not fulfilled) programming the option bytes (e.g., according to the presetting). The security check may be provided by means of a so-called security function unit ("Secure Engine Module") of the MCU. The functions of the secure engine module described herein may optionally also be or be provided by the forensic processor 204.

According to various embodiments, the embedded system 150, e.g., its processor 104, is configured to continue the boot process (also referred to as system startup) only when it has been determined that the option bytes are configured according to the presetting. This inhibits the risk in the event that an attacker succeeds in manipulating the configuration of the option bytes (e.g. by a physical attack) that the booted embedded system 150 is faulty.

According to various embodiments, the security function unit may also provide the functionality for configuring the dynamic security mechanisms (e.g. firewall).

Read-only protection (RDP) is configured to protect the data of the embedded system 150 from system-external access. For example, RDP is configured to protect one or more than one of the following memory areas from system-external access: Flash memory, option bytes, backup registers and SRAM2 (SRAM1 is not necessarily protected). The access rights for the application and the possible accesses via a debug interface are summarized in the following table.

| | | User application | | | Debug | | |
|---|---|---|---|---|---|---|---|
| Area | Level | Read | Write | Erase | Read | Write | Erase |
| Flash (main) memory | 1 | Yes | Yes | Yes | No | No | No |
| | 2 | Yes | Yes | Yes | N/A) | N/A | N/A |
| Option bytes | 1 | Yes | Yes | Yes | Yes | Yes | Yes |
| | 2 | Yes | No | No | N/A | N/A | N/A |

There are 3 possible settings (also known as levels) for RDP:

Level 0 specifies that the RDP protection mechanism is deactivated;

Level 1 specifies that the RDP protection mechanism is activated, but may be deactivated, as the option bytes may still be reprogrammed. When deactivated, however, the contents of the memory are deleted;

Level 2 specifies that the RDP protection mechanism is activated and may no longer be deactivated, as only read access to the option bytes is permitted from the application (also known as applying) while the debug interface is deactivated. In this case, all static security mechanisms are unchangeable.

To activate RDP, the RDP option byte may be programmed accordingly and then a system restart may be carried out. If the RDP is set to level 1, it may be reprogrammed, e.g. deactivated. To do this, the option bytes are reprogrammed, e.g. using the debug interface and/or the application. When the RDP is reprogrammed from level 1 to RDP level 0, the entire memory is automatically deleted.

FIG. 5 illustrates an exemplary implementation of various safeguarding mechanisms of the forensics module 250 according to various embodiments 500 in a schematic setup diagram (for example, implemented using the embedded system according to embodiments 100 or 400), which may be particularly easily transferred to a plurality of embedded systems (or CPS).

With RDP on level 1, the debug interface may still be used. In this case, the embedded system may be completely reprogrammed. Nevertheless, there are use cases in which an RDP at level 1 may also be considered in application-oriented operation, for example if access to the flash memory is restricted. The debug interface may be used, in particular, to bypass the firewall. This means that RDP at level 1 together with the firewall cannot necessarily be reliable or that the firewall cannot necessarily provide the security requirements. Furthermore, the debug interface may be used to change the boot configuration so that the embedded system 150 starts from SRAM1 or from the ST boot loader. This opens up an attack area if RDP level 1 is used.

If the embedded system 150, such as the STM32L4 microcontroller, additionally supports PCROP, this may provide additional protection for one or more than one cryptographic key of the embedded system 150 (e.g., a root attestation key, the encryption key 305s, and/or the signing key 307s). For example, PCROP is configured to configure one or more than one memory area of the non-volatile memory as "executable only" (also referred to as NA memory area). In this case, accessing, e.g. direct memory access (DMA), debug access, write access, read access and/or delete access, is blocked to this NA memory area. This region cannot even be addressed via the debug interface, except for execution.

According to various embodiments, it has been recognized that the PCROP makes it possible to better secure a key that is otherwise difficult to secure. For this purpose, data (also referred to as key-implementing data) is stored in the NA memory area, e.g. comprising an executable program code (e.g. an assembler function) or other code segments configured such that, when executed by the processor, they cause the processor to directly map the key (e.g. its bytes) directly to an address of another memory area (also referred to as a key target area) of the embedded system 150 as specified according to the data (then also referred to as a PCROP-secured key). The key-implementing data may, of course, implement the key differently, for example if PCROP is not supported or undesirable.

For example, the key-implementing data may be executed from the ROT protected by the firewall to write the key. After the key has been used, the key is deleted from the memory, e.g. the key target area, of the embedded system 150.

The PCROP-secured key ensures that the key is only available as executable code most of the time and is only made available for read access by a cryptographic process when the key is actually needed. This makes an attack on the key more difficult.

For this PCROP-secured key, the PCROP_RDP bit may be set to 1 so that the key in this region is deleted. Otherwise, the attacker could place RDP at level 0 and at the same time deactivate the protection of the NA memory area using RCROP. In this case, the memory blocks (e.g. flash blocks) comprising the key (e.g. as key-implementing data) would not be deleted and the attacker could read the key.

According to various embodiments, the entire memory area intended for one or more than one key may be secured using PCROP. This memory region may in turn be located behind the firewall (i.e. in its enclave), namely in the code region.

Write protection (WRP) may be configured to protect or secure a memory area from unwanted (system-internal) write access. If RDP is set to level 2 and the debug interface is therefore deactivated, the WRP may provide a purely internal and, above all, static security measure. For example, option bytes and therefore WRP settings cannot be changed. For example, memory areas in the flash may be protected permanently against changes using WRP. This makes WRP inflexible as a protection mechanism, but may be practical for keys, especially if these should or must not be changed for the lifetime of the embedded system. If the RDP is set to level 1, e.g. in a productive environment, WRP may also be reconfigured so that it is possible to temporarily deactivate the protection mechanism (e.g. for a firmware update). If a storage area is protected using PCROP, an additional WRP protection mechanism may be redundant.

While RDP, PCROP and WRP may be used to provide a statically secured memory area (e.g. of the flash memory) (or a static security mechanism), a firewall may be used to provide a dynamically secured memory area (or a dynamic security mechanism). The firewall makes it possible to provide a secured enclave (e.g. comprising one or more than one memory area) which, for example, has its own code, its own address area in the flash memory and/or its own address area in the RAM memory. Each memory area of the enclave is isolated from the rest of the environment and equipped with very strict access mechanisms, which are provided, for example, by the hardware of the embedded system 150.

For example, the firewall may be implemented as a trusted runtime environment. If the firewall is deactivated (e.g. unlike the static security mechanisms) during a system reset (system restart), it may be activated as part of the initialization process of the embedded system. However, the firewall may not yet be enabled at system startup, which opens up a chamber for an attack (e.g., side-channel attack)

that could prevent the firewall from being enabled in order to bypass this protection mechanism. This may be the case if the embedded system does not comprise a hardware-based RoT, such as TPM. In this case, it may be useful to protect the code segments (or instructions) that activate the firewall with WRP (including the interrupt table). Together with RDP at level 2, this prevents these code segments from being changed so that the integrity of the forensics module 250 or the TEE may be guaranteed.

FIG. 6 illustrates an exemplary implementation of the firewall 612 of the forensics module 250 according to various embodiments 600 in a schematic layout diagram of the MCU as part of the EGS 150 (e.g., configured according to embodiments 400), which may be applied in particular to a plurality of other embedded systems (or CPS).

The embedded system 150, e.g., its storage device 102, may comprise an at least one firewall-secured storage area 651 (also referred to as FW storage area 651). The at least one FW memory area 651 may comprise one or more than one (e.g., more than two) of the following memory areas: a first flash memory area 602 in which firmware is stored, a second flash memory area 604 in which data is stored, a RAM memory area 606, which may be exclusive or divided. The embedded system 150, e.g., its memory device 102, may further comprise a DMA controller 608 (also referred to as a DMA controller), which may be configured, for example, to perform a memory access (either to the main memory itself or to a peripheral component) independently of the processor 104 (e.g., the Cortex-M4 CPU), e.g., without utilizing the processor 104.

The at least one FW memory area 651 may be specified using a start address and the length of each memory area. For example, a granularity of 256 bytes is enforced for the flash memory areas and/or a granularity of 64 bytes is enforced for the RAM segment.

The firewall 612 may be configured to determine (e.g., monitor) all memory accesses to the at least one FW memory area 651 (e.g., to flash and RAM) that occur, for example, via the communication infrastructure 106, e.g., its "advanced high performance" bus (AHB bus), and/or, for each access of the memory, to determine whether the memory access is permitted (also referred to as legal), e.g., if it is privileged to do so, or prohibited (also referred to as illegal), e.g. if it is not privileged (also referred to as unprivileged). For this purpose, the firewall may, for example, be configured to determine where the memory access originates from and, based on this, determine whether this memory access is privileged. For example, an authentication sequence, which will be described in more detail later, may be privileged to access the FW memory area (also referred to as penetrating the firewall).

For example, the firewall 612 may be configured to block (also referred to as a blockade response) unauthorized memory access to the at least one FW memory area 651 (e.g., from outside the protected at least one FW memory area 651). Alternatively or additionally, the firewall 612 (then also referred to as a closed firewall) may be configured, for example, to reset the embedded system 150 (also referred to as a reset response) in response to the unauthorized memory access to the at least one FW memory area 651. The reset response and/or the blockade response may, for example, be implemented by means of hardware. For example, the reset response may comprise that the firewall does not trigger an interrupt, but resets the embedded system 150 directly.

The firewall 612 may be configured to determine a memory access as permissible (e.g. only if it is carried out using an interface configured for this purpose, the so-called call gate). For example, the call gate may be configured to increase the authorization level of the memory access if it meets a predefined criterion. For example, the call gate may be implemented as a processor function of the forensic processor 204. The call gate may be configured to cause a dynamic change in the authorization level of the forensic processor 204 when a particular instruction meeting the criterion is used. In this way, code and programs with fewer privileges may temporarily operate as if they were programs with higher privileges.

The call gate may be used to call isolated functions in the enclave, for example. This ensures that control is transferred to the code behind the firewall.

At the logical level, the call gate may be implemented using a function that receives the input parameters for the enclave behind the firewall 612 and returns a response. These input parameters may, for example, address a special function behind the firewall and provide the parameters for this function. At the technical level, the call gate may be configured to correspond to the firewall 612 or be configured accordingly.

FIG. 7 illustrates a state diagram of a firewall 612 (for example configured according to embodiments 600) according to various embodiments 700 in a schematic flowchart, which may be applied in particular to a plurality of other embedded systems (or CPS).

The code may be executed behind the firewall by calling the call gate. When the call gate is passed, the firewall is opened so that it may be passed through. In this state, the code stored in at least one FW memory area 651 is executed as normal, for example as if there were no firewall at all.

For example, the firewall may be configured to either perform the reset response or close the firewall in response to a jump from within the at least one FW memory region 651 to an address outside the at least one FW memory region 651 ("irregular exit from the protected region"). The firewall may make the decision on the basis of a data variable (also referred to as a flag) in a predefined register, which is located in the at least one FW memory area 651 and may be configured (for example, firewall pre-arm flag in register FW_CR). This is an additional safeguard mechanism to avoid such jumps. Before a regular exit of the code behind the firewall ("regular exit of the protected region"), this flag is set and then control is transferred to the application (via a normal return from the function). If this flag is not set and the code leaves the protected region, this is interpreted by the firewall as irregular behavior and the firewall resets the embedded system. It is also useful to disable the interrupts for this protection mechanism.

The firewall may be used to secure one or more than one algorithm by means of which a cryptographic process is implemented and/or one or more than one cryptographic key. Alternatively or additionally, security-critical processes such as a firmware update (also known as a firmware update) may be secured. An algorithm secured in this way is executed in isolation and only the result is returned. This ensures, for example, that any intermediate results remain secure behind the firewall, which may be important for cryptographic functions. It also ensures on a technical level that only dedicated functions may access a secure key directly.

In various embodiments, the firewall is configured to check (e.g., block and/or, e.g., if allowed, unblock) all accesses to the FW memory area 651 (e.g., from the MCU and/or DMA).

Exemplary implementations of forensic extraction 750 and their components are explained below.

FIG. 8 illustrates determining 303 the commitment 310 (for example configured according to embodiments 300) using a cryptographic vector commitment process (VC process) according to various embodiments 800 in a schematic flowchart. The VC process 304 refers to a specialized commitment process that allows dedicated portions of the extracted system state to be individually disclosed without violating their authenticity.

Illustratively, a commitment process allows a party to attest to a piece of information (e.g. the status data) without having to disclose the information (also referred to as a confidentiality property). The information therefore remains secret for the time being. In addition, the commitment process makes it possible to reveal the information at a later point in time and to ensure that the information remains unchanged (also referred to as binding property), e.g. cannot be modified. For this purpose, cryptographic measures are used to provide proof (the so-called commitment), which enables verification of the information revealed.

A commitment process may have two phases (also referred to as the first phase and the second phase), each of which may be implemented using an individual algorithm, for example.

In the first phase (also referred to as the commitment phase), the commitment 310 may be determined, for example by means of a first algorithm (also referred to as a commitment algorithm or commit). The commitment algorithm may be configured to output the commitment c and optionally an opening value d as output data based on input data m (e.g. a message or the status data). Expressed as a relation, this may be written as Commit(m)→(c, d). The opening value d is kept secret and the commitment c is published. The opening value d may, for example, be a random number or other random character string, for example determined using a random number generator (also known as RAND), and/or also determined or specified using another mechanism. For example, the opening value may be used as a key that parameterizes the commitment process and thus influences the output commitment c (e.g. independently of the input data m).

In the second phase (also referred to as the opening phase), it may be determined based on the commitment c whether an assertion m' (illustratively the asserted input data) corresponds to the original input data m based on the commitment c and the opening value d (also referred to as verification), for example using a second algorithm (also referred to as a verification algorithm or ComVrfy). The verification algorithm may be configured to determine, based on the assertion m' as input data and the opening value d, whether m' matches the commitment c (e.g. without knowing m). Expressed as a relation, this may be written as ComVrfy(c, d, m)→b, where m=m' if b=1 (or if b satisfies some other criterion). For example, the output b may only have the value 1 or 0).

A less complex implementation of the commitment process may be carried out using a cryptographic hash function H as part of the commitment algorithm. The commitment algorithm generates a random counter d and calculates c=H(d, m). The random value d is then the opening value and is first kept secret. The hash function H may be configured in such a way that the hash value or the commitment c does not reveal anything about the input data m due to the random choice of d. As soon as d is known, it is possible to verify whether c=H(d, m') for any given assertion m'. If c=H(d, m'), this implies that m'=m.

The binding property may be favored, for example, if the hash function H is collision resistant, e.g. weakly collision resistant, preferably strongly collision resistant or further preferably perfectly collision resistant. For example, the hash function H may be a collision-resistant one-way function and/or be from the class of secure hashing algorithms.

The VC process 304 is a special commitment process in which the input data m is multi-component, for example comprising n components. This may be notated, for example, in the easily understandable vector notation, whereby it may be understood that any other notation of the multi-component input data may also be used. Accordingly, the aspects explained with respect to the vector notation may apply by analogy to any other notation of the multi-component input data.

In vector notation, the multi-component input data m may be written as $m=(m_1, \ldots, m_n)$. The special feature of the VC process 304 is that the complete vector m does not necessarily have to be uncovered, but individual components $m_k$, with $k \in [1, n]$ may also be uncovered without violating the binding property. The commitment algorithm of the VC process may then be written as Commit(m)→(c, d).

The opening phase of the VC process 304 may comprise first determining (illustratively as an intermediate step) one or more than one bound pair of $I \in \{1, n\}$ and opening value $d_1$, e.g. using a third algorithm (also referred to as a partial close algorithm or PartClose). For example, the partial close algorithm may be configured to determine the opening value $d_k$ based on the opening value d, the input data m and the value $I \in [1, n]$. Expressed as a relation, this may be written as $$PartClose(d,(m_1, \ldots, m_n),I) \rightarrow (d_I,m_I),$$

with $m_I=(m'_1, \ldots, m'_n)$, where $\forall i \in I: m'_i=m_i, \forall i \notin I: m'_i=\perp$.

This partial close algorithm may be used to calculate opening values $d_I$ for an index set $I \subseteq [n]$.

Each opening value $d_i$ may, for example, be determined in advance using a random number generator (also known as RAND).

The corresponding verification algorithm may then be written as $ComVrfy(c, d_I, m_I) \rightarrow b$. This verification algorithm verifies the partially opened data against the commitment c.

A less complex implementation of the VC process 304 may be carried out using a cryptographic hash function H as part of the commitment algorithm. The commitment algorithm generates a first commitment for each i (i=1, . . . , i=n) (also referred to as intermediate commitment $c_1$ or commitment component) $c_i=H(d_i, m_i)$. The random values $d_1$ together then form the opening value d, which is kept secret. The intermediate commitments are combined to form a hash value or second commitment c (also referred to as the final commitment), for example according to the following relation: $c=H(c_1, \ldots, c_n)$.

The partial close algorithm is configured to uncover a $d_i$ for each $i \in I$, while the $c_i$ is calculated for the remaining i and revealed as part of $d_I$. This means that during verification, the final commitment c may be reconstructed or verified from the intermediate commitments $c_i$ and the pair $(d_i, m_i)$.

The less complex implementation of the VC process 304 using a cryptographic hash function H also ensures that the extraction 350 may be carried out in a single pass and with as little memory required as possible. For example, the hash function may be instantiated with SHA-256 from the SHA-2 family (SHA denotes a secure hash algorithm). The data is then processed in blocks of 64 bytes, which corresponds to the internal state of SHA-256. With regard to the exemplary choice of SHA-256, it may be understood that what is described herein may apply by analogy to any other SHA.

Another exemplary implementation is described in more detail below. The starting point of the extraction 350 is a configurable data variable indicating which memory areas of the embedded system 150 are to be read. Logically, this data variable may be notated as a list of tuples, each tuple specifying a memory address of the corresponding memory area and the length of the corresponding memory area. The memory areas are optionally grouped (also known as memory grouping), which may be configured depending on the application. This memory grouping may be relevant for the subsequent opening of the data and corresponds to the individual components $m_k$ (also referred to as data records) of the input data m for the VC process. This means that either all memory areas of a group (also referred to as a memory group) or none of the memory areas of the group are revealed. The larger the number n of memory groups, the finer the raster and the more selectively the information may be uncovered.

Each section (also referred to as a group section or "section") of a memory group comprises a memory area or several (e.g. contiguous) memory areas, which may also have a certain logical connection to each other, for example. The register file (e.g. of the CPU), for example, forms its own memory group.

Memory grouping illustratively partitions the system state into memory groups, each memory group comprising one or more than one group section and/or corresponding to one of the data sets $m_k$. In the exemplary implementation of memory grouping, a number of n memory groups are formed, each memory group comprising an individual number of $l_k$ group sections. The k-th memory group has, for example, $l_k$ group sections, whereby, for example, it may be $l_k > 1$ and/or $l_k \neq l_{k+1}$, but does not necessarily have to be.

As soon as the ith data record $m_i$ (e.g. corresponding to the ith memory group) has been processed, the ith intermediate comment $c_i$ is calculated (e.g. using the hash function), which is processed in the vector comment state (VC_State). If, for example, SHA-256 is used for this, only a further 64 bytes are required. Such an instantiation of the VC process only requires 128 bytes. In addition, a constant overhead may be provided for the specific implementation of the SHA-256 function.

For example, an initial vector-commitment status is provided (e.g. by means of a function V_Init) and updated based on the first determined intermediate complement $c_1$ (e.g. by means of a function VC_Update). The updated vector commitment status may be updated iteratively based on each individual intermediate commitment determined $c_i$. The final comment c is determined based on the last updated vector comment status and the last determined intermediate comment on (e.g. using a VC_Final function).

FIG. 9 illustrates the encryption 305 according to various embodiments 900 in a schematic flowchart, which may be configured according to embodiments 300, for example.

The encryption 305 may, but need not necessarily, run in parallel with the determining of the commitment 310 (e.g., according to embodiments 800). This is particularly suitable if both, the encryption 305 and the determination of the commitment 310, process the same data records $m_k$ or are based on the same memory grouping.

Optionally, each individual group section may be or may be coded in such a way that it is an independent and valid block (e.g. IHEX block), for example apart from the missing end-of-file record. For example, each block (e.g. IHEX block) starts with an extended address so that all information from $m_i$ may be clearly assigned to the respective memory addresses, e.g. without having to see/know other blocks (e.g. IHEX blocks). This procedure makes it easier to merge the state data into a complete (e.g. IHEX) coded state when decoding it later.

The encryption 305 or the encryption process 306 is configured to output the system state in encrypted form 312 (also referred to as cryptogram 312). Together with the state data 302, the several determined opening values $d=(d_1, d_2, \ldots, d_n)$ of the VC process may optionally be encrypted so that they may be transmitted confidentially by means of the cryptogram 312. Then, the encryption 305 may comprise encrypting the state data 302 and the plurality of opening values into the cryptogram 312.

As shown, the encryption 305 may be performed using the encryption process 306. In an exemplary implementation, the encryption process 306 or the encryption 305 may use an Authenticated Encryption with Associated Data (AEAD), for example, the so-called Galois/Counter Mode (GCM) with AES (Advanced Encryption Standard) as the block cipher. This also ensures the authenticity of the status data and protects its integrity. The authenticity may be verified, for example, by the manufacturer, who has access to the device-specific (e.g. symmetric) encryption key 305s. For the public authenticity check, for example by the investigator or a court, a signature may optionally be calculated over the read-out state data (also referred to as signing 307), as will be explained in more detail later.

According to various embodiments, the encryption key 305s may be a system-specific (e.g., symmetric) key, such as a key uniquely associated with and/or stored in the embedded system 150. This may be provided by determining the encryption key 305s based on a master key (e.g., of the manufacturer) and the identity of the embedded system 150, for example, using a key derivation function ("KDF" for short).

An exemplary implementation of the encryption process 306 may be performed using a (e.g. symmetric) encryption algorithm. For example, the encryption algorithm may be configured to process the state data 302 block by block, wherein the state data 302 may optionally be input byte by byte or even bit by bit. When a complete block is given, it is processed and the result is returned (e.g. using the AEAD_Update function). The authentication tag (also referred to as "tag") is calculated similarly and in parallel, whereby the associated data is initially included in the calculation and no intermediate results need to be output. In this case, the associated data comprises so-called (e.g. random) moment information (also referred to as "nonce" or one-way information), which is determined at the start of extraction 350, for example using a random number generator (also referred to as RAND).

For example, an initial AEAD state (AEAD_State) is provided (e.g. by means of an AEAD_Init), optionally based on the nonce and/or the encryption key 305s. This initial AEAD state is updated based on the first encrypted data set $m_1$ (e.g. by means of an AEAD_Update) and subsequently updated with the first encrypted opening value $d_1$ (e.g. by means of an AEAD_Update). The AEAD status updated in this way may be updated iteratively based on each tuple ($m_i$, $d_i$). The final AEAD status (AEAD_Final) is determined based on the last updated AEAD status. Based on the final AEAD status, the cryptogram 312 and/or the tag may be determined.

For example, the encryption process 306 is configured to require a number of bytes equal to twice the block length (32 bytes in the case of AES). A constant overhead, which may depend on the exact implementation of the GCM mode, may optionally be additionally provided. In addition, if used, the memory requirement for the encoding (e.g. IHEX encoding) is added. In the case of IHEX encoding, the data is encoded in lines of configurable length. For example, 32 bytes may be encoded per line, resulting in 11+64 bytes per line. As with GCM, a constant overhead may also be provided here by the specific implementation of IHEX coding.

According to various embodiments, the system state or state data is held in the memory area of the embedded system 150 reserved for the forensics module 250, which inhibits divide of the system state from being overwritten by the embedded system 150.

FIG. 10 illustrates signing 307 according to various embodiments 1000 in a schematic flowchart, which may be configured according to embodiments 300, for example. Optionally, the signing 307 may run in parallel with the encryption 305 and/or in parallel with the determining 303 of the commitment 312.

Unlike encryption 305 (e.g., using AEAD), the signature 314 may be publicly verified so that it may be used, for example, by the investigator and/or in court. According to various embodiments, the signing 307 is configured such that the signature 314 enables authentication of the extracted state data 302, for example when it is publicly verified, so that the complete state data 302 does not need to be opened. Optionally, for example in contrast to the VC process 304, the signing 307 may be based on encrypted and/or compressed state data 302 (e.g. a cryptogram $ct_i$ based thereon).

An exemplary implementation of the signature process 308 may comprise that the state data 302 is initially compressed (also referred to as compressing) (e.g., using a hash function H) and only then determining the signature 314 based on the result of the compressing. For example, a SHA-256 hash function with the 64-byte internal state may be used for compression. Initially, the specified nonce is optionally included in the signature process 308. Then each cryptogram $ct_i$ (e.g. ciphertext formed using AEAD) is included as a block in the calculation of the signature process 308 (for example, including the final calculated tag). Finally, the determined commitment 310 is processed. The hash value calculated from this is finally signed (for example using a "Sign" function). At this point, all the data has already been processed so that the internal state for the actual signing 307 does not need to be added to the memory requirements of extraction 350.

For example, an initial hash status (HASH_State) is provided (e.g. using a function HASH_Init), optionally based on the nonce. The initial hash status is updated based on a cryptogram $ct_1$ determined first (e.g. using a function HASH_Update), which is based on the first data set $m_1$. The hash status updated in this way may be updated iteratively based on each determined cryptogram $ct_i$. The final hash value h (HashValue) is determined based on the last updated hash status and the commitment 310. The signature 314 is determined based on the final hash value h and the signature key 307s.

For example, to promote authenticity and public verifiability of the state data 302, a key pair (e.g., private signature key 307s and public key) may be provided for signing 307. The public key of the embedded system 150 may, for example, be provided to the investigator.

FIG. 11 illustrates the forensics module 250 according to various embodiments 1100 in a schematic layout diagram (for example configured according to embodiments 100 and/or 400). As explained above, the encoding, if any, does not necessarily have to be performed using IHEX.

The forensics module 250 comprises the trusted memory area 402 comprising first key data implementing the encryption key 305s and/or second key data implementing the signature key 307s. The first key data and/or second key data may comprise the respective implemented key as plain text, or executable program code that causes the processor 104, upon execution of the program code, to write the implemented key to the key target area (e.g., provided in the trusted memory area 402). The encryption key 305s ("key", see FIG. 9) may be used for authenticated encryption 305. The signing key 307s ("sk", see FIG. 10) may be used for signing 307.

Encryption 305 provides confidentiality for the state data 302, which allows portions of the system state or state data 302, such as trade secrets (e.g., IP) of the manufacturer therein, to be kept secret. In addition, the opening value of the commitment process is also encrypted in order to maintain the confidential nature of the commitment process.

The nonce, together with the encrypted status data 302, may also be authenticated using the AEAD mode. Unlike in the case of the signature 314, for example, only the manufacturer may verify the correctness of the tag. The signature 314 is calculated, for example, based on the ciphertext 312 and the comment 310 and optionally the nonce. The signature 314 is primarily used for integrity verification by a third party, such as a court or investigator.

The manufacturer does not necessarily have to verify the signature 314, as the nonce is already authenticated by AEAD and as the commitment 310 may be recalculated, this is the reason why the nonce may be used as associated data with AEAD.

The VC process 304 is a particularly advantageous function of the forensics module 250. For example, the VC process 304 enables protection against a malicious and/or compromised manufacturer. The VC process 304 enables, alternatively or additionally, only individual portions of the system state or state data 302 (e.g., a single record) to be made public, e.g., as needed, such as in the event of a legal dispute. The VC process 304 thus also indirectly serves to protect the manufacturer's company secrets as well as the public interest.

In principle, however, it is also possible, for example in cooperation with the investigator, to disclose the complete system state or the complete state data 302. The investigator may verify whether the state data 302 really originates from an embedded system 150 (or investigation case) identified by the nonce for the data packet extracted by him, e.g. without having to use the manufacturer's secret keys. By partially opening the system state, it is further possible to be able to publish important data parts, such as malicious code (e.g. malware of the attacker), in court and thereby be able to cryptographically prove that the state data 302 belongs to the embedded system 150 or to the investigation case.

The forensics module 250 further comprises an additional interface 1102 (also referred to as output interface 1102), wherein the at least one processor 104 is configured to transmit the result of the extraction 350 to a destination 1104 external to the system (i.e., external to the embedded system 150), e.g., to another computing device, by means of the output interface 1102. The result of the extraction 350 may comprise the commitment 310, the cryptogram 312, and/or the signature 314. The target 1104 may be, for example, the extraction trigger and/or may be stored by the embedded system 150 (illustratively as a preset). The output interface 1102 may, for example, be configured as a networking interface as explained above.

Extraction 350, which may be initiated during operation, was explained above. A similar process for system startup (also referred to as boot) is explained below (also referred to as "boot attestation").

FIG. 12 illustrates a software stack 1250 of the EGS 150 according to various embodiments 1200 in a schematic layout diagram. The software stack 1250 represents the to-be-determined system state and comprises multiple layers (also referred to as software layers), a lowermost (e.g., first) layer of which provides a secured region 1202 of the RoT (also referred to as ROT layer 1202). Further, the memory area 1204 is indicated in which the respective software layers are stored. Each of the software layers may comprise, for example, parameters (also referred to as program parameters, such as program data) and/or program code.

The boot attestation described herein makes it possible to separate the readout of the status data 302 from the attestation (also referred to as authentication) in terms of time. The readout of the status data 302 may take place during the system startup of the EGS 150 (or CPS). The attestation may then be carried out as a protocol between the inspector and the EGS 150 at any later time by an application ("app").

The forensic extraction 350 according to the boot-attestation may comprise the (e.g. bit-accurate) reading 301 of the state data 302 (e.g. comprising a memory image) by means of the forensic interface 208, wherein the state data 302 comprises a plurality of data sets $m_k$ (k=1 . . . n). In the example shown, n=4. The i-th data set $m_i$ may represent the i-th software layer $s_i$ comprising, for example, its parameters and/or program code (also referred to as code for short). For example, the i-th data set may comprise the complete content of the i-th software layer $s_i$.

In the exemplary implementation shown here, the lowest (or very first) software layer $s_0$ (k=0) has the ROT layer 1202. The uppermost (or very last) software layer $s_n$ (k=n) has, for example, the system application (also referred to as an "app"), e.g. an EGS application or CPS application. Examples of intermediate layers (n>i>0)) include bootloader ("BL") or operating system (e.g. an RTOS). The RoT layer 1202 comprises a so-called root attestation key RK (also referred to as root attestation key or "root key"), which may be used as the initial attestation key "$AK_0$" (also referred to as reference key $AK_0$).

In various embodiments, the root attestation key may be or become secured by means of the firewall and/or PCROP. In addition to the firewall, PCROP makes it possible, for example, to protect the root attestation key from internal access.

The EGS 150 may be started in stages according to a corresponding sequence (also referred to as a system start sequence). Illustratively, the system startup sequence may comprise a plurality of successively executed stages, of which the i-th stage starts and/or executes exactly the i-th software layer and/or transfers control of the EGS 150 to the i-th software layer. For example, the system startup sequence may be implemented by the i-th software layer being configured (e.g., comprising instructions to) execute the (e.g., immediately) subsequent i+1-th stage of the system startup sequence (e.g., starting the i+1-th software layer). Of course, the instructions implementing the system startup sequence may also be provided separately from the software stack 1250.

The EGS 150 (e.g., the forensic processor 204) is configured to perform an attestation sequence (also referred to as an attestation sequence) during the system startup sequence. The attestation sequence may be implemented as a separate sequence from the system startup sequence or may be integrated into the system startup sequence and/or the software stack (e.g., as part of the system startup sequence). In an exemplary implementation of the attestation sequence, the i-th software layer is configured to read the (e.g. immediately) subsequent i+1-th software layer and determine an i+1-th key (also referred to as an i+1-th attestation key) based thereon. More generally speaking, the i-th software layer may, for example, have instructions for determining the i+1-th attestation key $AK_i$. Of course, the instructions implementing the attestation sequence may also be provided separately from the software stack 1250.

The application may then later perform an attestation with the verifier at any time based on the derived nth attestation key $AK_n$ and prove whether the system status was manipulated or not manipulated during the last system start. For example, the verifier may also initiate a new system start (e.g. using the extraction trigger) before an attestation is performed.

Using the attestation sequence, the software stack 1250 of the EGS 150 may be read out during system startup and starting with a secure ROT, for example with low requirements for each of the software layers $s_i$ (i>0). The attestation itself is then carried out by the application, for example without this functionality having to be specially secured (although this may well be the case). The cryptographic processing ensures that the attestation may be carried out successfully (for example, only if the system status was not manipulated during system startup). Furthermore, if the verifier initiates a system start (also known as a boot process), the attestation may only be successfully completed (for example) if the boot process is actually carried out.

An exemplary implementation of the authentication sequence or the system boot sequence is explained below. The authentication sequence may, for example, receive a nonce $N_B$ (also known as a boot nonce) as input, which is used as a verification key. The boot nonce may, for example, be a number (e.g. a random number) or other random character string that is only used once.

This boot nonce $N_B$ ensures that the tester may detect if the system restart (also known as a reboot process) is suppressed by an attacker. Initially, e.g. when the EGS 150 (or a CPS) is put into operation, a standardized (e.g. stored) nonce may be used as a boot nonce. The boot nonce $N_B$ may optionally be updated, e.g. set to a new value, before the very first boot attestation. The updating of the boot nonce may be performed, for example, using the forensic processor 204 and/or based on information received from the EGS 150 (e.g., from external to the system, e.g., specified by the tester). The root attestation key may be stored in the ROT layer 1202 as a secret key RK (e.g., on a ROM), which is used individually for the EGS 150 (or a series of EGS 150) and is written during manufacture of the EGS 150. This root key may be known to the tester who will perform the attestation.

For example, the RoT layer 1202 is configured to cause the forensics module 250 (e.g., the forensics processor 204) to instruct or even perform the readout of the (e.g., immediately) subsequent software layer (BL in this example).

For example, as an intermediate step, a hash value $h_1$ may be determined using a cryptographic hash function H based on the read data set $m_1$ of the BL (e.g. comprising code and/or parameters of the BL), for example according to the relation $h_1:=H(m_1)$. The data set $m_1$ of the BL may optionally comprise sensor data of the EGS 150.

Before the RoT layer 1202 transfers control to BL, the first attestation key $AK_1$ is calculated. The first attestation key $AK_1$ is based on the root key, optionally the boot nonce, and the first data set $m_1$ (e.g. the hash value $h_1$), for example according to the relation $AK_1:=KDF(RK,NB,m_1)$ or $AK_1:=KDF(RK,NB,h_1)$, whereby NB may optionally be omitted. KDF may, for example, be a cryptographic key derivation function. The first attestation key $AK_1$ is now stored for access by the BL, access to the root key is blocked and control is transferred to the BL.

This status of the authentication sequence is shown below.

FIG. 13 illustrates the state 1350 of the software stack 1250 of the system 150 according to various embodiments 1300 in a schematic flowchart during the attestation sequence, according to which the first attestation key $AK_1$ has been determined and additional attestation keys are subsequently determined.

More generally, the extraction 350 may comprise, in 1301, determining, prior to executing the first stage (i=1) of the system startup sequence, a first attestation key $AK_1$ (also referred to as "Attestation Key 1") using a cryptographic process (comprising, for example, a hash function and/or a KDF) based on the data set $m_1$ of the first stage (i=1), the reference key $AK_0$ and optionally the verification key BN. For example, the cryptographic key derivation function may be used as the cryptographic process.

The attestation sequence may further comprise, in 1303, determining, prior to executing the i-th stage of the system startup sequence $i \in \{2, \ldots, n\}$, an i-th attestation key $AK_i$ (e.g., attestation key 2 or 3, respectively) using the cryptographic process based on the data set $m_i$ of the i-th stage and the $(i-1)$-th attestation key $AK_{i-1}$.

In an exemplary implementation, each i-th software layer $s_i$ (with $i \in \{1, \ldots, n\}$, for example n=3 as shown) is configured similarly to RoT. However, the i-th attestation key $AK_i$ is determined for i>2 based on the $(i-1)$-th attestation key $AK_{i-1}$ instead of the root key, whereupon the $(i-1)$-th attestation key $AK_{i-1}$ is securely deleted or overwritten before being transferred to the i-th software layer, for example. The BN is no longer necessarily processed for i>2.

Determining the attestation key may also be written similarly to the above relation as: $h_i:=H(m_i)$, $AK_i:=KDF(AK_{i-1},h_i)$, or if H is not used as: $AK_i:=KDF(AK_{i-1},m_i)$.

The BN ensures that each boot process is unique and that temporary secrets on different software layers, which may have been corrupted, become useless. This BN is generated, for example, by the extraction trigger (e.g. the tester) and transmitted to the EGS 150. This ensures that the value of the BN is reselected for each extraction 350.

After the boot process (e.g. with a freshly selected BN) has been completed, the software stack 1250 of the EGS 150 may now be verified (e.g. by the tester). For this purpose, a request-response protocol (the so-called "challenge-response protocol") may be carried out between the application and the verifier. The verifier selects a random challenge NV (also known as a verifier nonce or PN) and sends this as a knowledge request to the EGS 150.

The application responds to this challenge by issuing a proof of knowledge (also referred to as proof-of-knowledge) for the attestation key, e.g. in the form of a message authentication code (also referred to as MAC), for example according to the relation $r \leftarrow MAC(AK_n, NV)$. In addition to this value, the application may transmit both the boot nonce and the results $h_1, \ldots, h_n$ to the verifier. This may be useful if there are several valid software versions of the EGS 150 and the inspector needs to quickly recognize the current version.

For example, these sent results $h_1, \ldots, h_n$ do not necessarily have to be secured separately against manipulation, as the verifier may only use the results $h_1, \ldots, h_n$ for the assignment, whereas the system state is guaranteed by the cryptographically secured response r to the challenge. Knowing the response r, the verifier may now use its copy of the root key RK, the boot nonce NB and the expected device state $(m'_1, \ldots, m'_n)$ or $(h'_1, \ldots, h'_n)$ to perform the same calculations that were performed during the boot process in order to calculate an $AK'_n$ and validate the response based on this, for example according to the relation $Vrfy(AK'_n, NV, r) \rightarrow b$, where $AK'_n=AK_n$ or $(m'_1, \ldots, m'_n)=(m_1, \ldots, m_n)$, if b=1 (or if b fulfills another criterion). For example, the output b may only have the value 1 or 0.

The security property of the attestation sequence allows $(m'_1, \ldots, m'_n)=(m_1, \ldots, m_n)$ if r was calculated correctly. This safety property is favored if one or more than one (e.g. all) of the following criteria are met:

H is a collision-resistant hash function;

KDF is a (e.g. secure) cryptographic key derivation function;

$\Pi=(Key Gen, Mac, Vrfy)$ is a (e.g. secure) cryptographic MAC process;

Access to the key $RK \leftarrow Key Gen (1^\lambda)$ is exclusively for the RoT;

Each attestation key $AK_{i-1}$ is deleted before the control is transferred to the i-th software layer.

In an exemplary implementation, the attestation sequence is executed on the selected microcontroller. Furthermore, a firewall is used to protect the root key. For example, before handover to the application, the firewall is configured and switched on and configured in such a way that any attempt to access the memory area of the root key is immediately responded to by the embedded system 150 being reset by the firewall (e.g. by means of a hardware reset by the firewall), e.g. by performing the reset response. If the functionality of the firewall is completely realized, e.g. to place code segments that implement the extraction 350 behind the firewall or in the enclave, the root key may still be placed behind the firewall. Optionally, the root key may be or be additionally secured by means of a PCROP, which could protect the firewall from unintentional access when used in this way. Alternatively or additionally, the RoT layer (e.g. comprising the root key) may be stored in the ROM of the EGS 150 and/or secured by means of the firewall.

Examples of input data for the attestation sequence comprising:

the (e.g. for the EGS 150 individual) root key for the EGS 150 which is to be verified, a freshly generated boot nonce, the status data 302, which represent the expected firmware, and optional additional data to be verified by the attestation sequence.

As an example, the option bytes may be used as additional data.

The input data of the attestation sequence is used to derive the attestation key. Once the very last attestation key $AK_n$ has been generated, it may be verified. For this purpose, a challenge is generated for the EGS 150. Before the attestation may be carried out, the previously generated boot nonce may be sent to the EGS 150. Together with the boot note, the EGS 150 receives the instruction to restart the software (in practice, this may also be arranged differently). During the restart, the boot nonce is included in determining the attestation key $AK_n$ and after the restart is completed, the application logs in, for example with the new boot nonce.

The actual attestation is carried out after the restart. The new challenge is sent to the EGS 150. The EGS 150 may only answer the challenge correctly, for example, if a restart was previously carried out with the specified boot nonce and the actual system status of the EGS 150 (also referred to as the actual system status) corresponds to the expected system status (also referred to as the target system status).

The emulation system is described in more detail below.

FIG. 14 illustrates an emulation system 1450 according to various embodiments 1400 in a schematic layout diagram. The emulation system 1450 is configured to emulate the EGS 150 system comprising the embedded processor 104 and the at least one sensor 110 and/or at least one actuator 112.

The emulation system 1450 comprises a digital interface 1410 for receiving the (e.g., decrypted) state data 302, a (physical) communication interface 1408 (also referred to as a peripheral interface) to at least one sensor 1408s (also referred to as an emulation sensor 1408s) and/or at least one actuator 1408a (also referred to as an emulation actuator). The or each emulation sensor may be identical in construction to the respective sensor 110 of the EGS 150 or at least an emulated representation thereof. The or each emulation actuator 1408a may be identical in construction to, or at least an emulated representation of, the respective actuator 112 of the EGS 150. For example, one or more than one sensor 110 and/or one or more than one actuator of the EGS 150 may be emulated as emulation actuator 1408a or emulation sensor 1408s. For example, the emulation actuator may represent a motor of the EGS 150 (e.g., be identical in construction thereto or at least an emulated representation thereof).

The emulation system 1450 further comprises at least one processor 1404 (also referred to as an emulation processor) configured to emulate the EGS 150. For example, the emulation system 1450 or the emulation processor may be configured to emulate a component of an ATM as the EGS 150, such as one of the following components of the ATM:

a cassette (e.g. cash box)
a reading device (e.g. for reading an RFID chip, a credit card, a smart card or similar),
a printer,
a camera,
a network device (e.g. a network card),
a transport device (e.g. for transporting banknotes or other documents of value),
a validation device (e.g. in an ATM),
a payout device (also known as a payout module),
a deposit device,
a user interface (e.g. comprising a pin pad, a keyboard, a touch screen or the like), e.g. an encrypting PIN keypad.

The emulation processor 1404 is further configured to communicate via the communication interface 1408 in the same manner as the embedded processor 104 communicates via the functional interface 108, e.g., with the at least one sensor 110 or at least one actuator 112 of the EGS 150.

The emulation system 1450 further comprises a memory device 1402 (e.g., comprising one or more than one data memory 102s, 112s).

The emulation system 1450 further comprises a communication infrastructure 1406 (e.g., comprising a CAN bus or other fieldbus) that couples at least the memory device 1402, the emulation processor 1404, the digital interface 1410, and/or the communication interface 1408.

Optionally, the emulation system 1450 may be configured to reconstruct (also referred to as reconstruct or restore) the system state based on the state data 302, e.g., in handler mode. The reconstruction may comprise, for example, reconstructing the processor register (e.g., CPU registers) and/or peripheral registers.

Reconstruction in handler mode provides extended privileges that are favorable for the execution of some instructions and may take place, for example, if the CPU registers were also saved in handler mode. To continue the code after reconstruction at this point, the CPU may be in the same mode. This ensures that a reconstruction with the corresponding code for exiting handler mode is executed correctly. The corresponding exception for entering handler mode may be triggered (e.g. instructed) by writing the interrupt control and state register ("Interrupt Control and State Register" or ICSR for short), either by software from thread mode or by the debugger.

For this purpose, the forensics module 250 may install the corresponding interrupt handler. Writing the ICSR triggers a non-maskable interrupt ("non-maskable interrupt" or NMI for short).

For example, the reconstruction may comprise one or more than one of the following:

resetting the protection mechanisms;
reconstruction of the persistent flash memory;
reconstruction of the volatile RAM memory;
reconstruction of one or more than one peripheral register;
reconstruction of one or more than one processor register.

To reconstruct and read the flash memory, the option bytes may first be activated at RDP level 0. This automatically deletes the flash memory during the transition from level 1 to level 0. In EGS 150, the option bytes may be at level 2 to completely deactivate the debug interface. If the debug interface of the emulation system 1450 is to be activated, level 2 may also be emulated by level 1. This may require a patch of the corresponding option bytes before they are programmed in the next step. The content of the flash memory according to the state data 302 may then be programmed into the emulation system 1450. This may be done using OpenOCD, for example. For example, the flash memory may be or may be partitioned such that the functionality for reconstructing the processor register (e.g., CPU core register) as part of the forensics module 250 resides in a flash memory area that does not necessarily have to be physically present in the MCU of the EGS 150. This means that programming the memory image does not overwrite the forensics module 250.

The RAM may have the following data according to the status data, which may be automatically reconstructed by loading the RAM background: stack, heap, register file (e.g. CPU register file). The RAM may be written directly by a debugger, for example. Prior to this, the emulation system 1450 may be or may be configured in such a way that the code for reconstructing the processor register (e.g. CPU register) is executed immediately after reconstruction of RAM and peripheral registers. Writing the ICSR may trigger an NMI and thus sets the CPU to handler mode. This jumps to the NMI exception handler, which the forensics module 250 has installed accordingly. If the memory dump was executed within an interrupt handler in handler mode, this ensures that the CPU also continues in handler mode after reconstruction. The memory content of the RAM may then be reconstructed using a restore command.

The peripheral registers are mapped into the address space of the MCU. Like flash memory and RAM, these may therefore initially be mapped from the extracted state into a separate file. The status registers may be an exception, which in some cases cannot always be written by the software interface, but whose content may only be accessed by manipulating the hardware. For example, the input register of an IO pin reflects the status of the pin and may often only be modified by applying a corresponding potential to the pin itself. A peripheral emulator may be used to reconstruct the state of such registers.

In contrast to the peripheral registers, the processor registers cannot necessarily be written directly. In this case, they are written using dedicated processor instructions (e.g. CPU instructions).

Once the processor registers have been reconstructed, the exception handler may be exited and the system state may be set to the correct program code address. This is done, for example, by loading a so-called exception return or a return address. This causes the CPU to exit the handler mode and load the exception frame from the stack.

An exemplary emulation system 1450 is configured to emulate relevant components of the EGS 150 using emulation, including, for example, the memory device 102, the embedded processor 104, the communication infrastructure 106, and/or the interface 108. For example, at least the embedded processor 104 and the interface 108 may be emulated.

In the following, the emulation of the EGS 150 is explained using the MCU of the EGS 150 as an example. It may be understood that what is described may apply by analogy to a differently implemented EGS 150. The MCU of the emulation system 1450 (also referred to as the emulation MCU) emulates the MCU of the EGS 150. The emulation MCU may, for example, be a developer version of the MCU of the EGS 150, as is also used for functional error analysis. The emulation MCU comprises, for example, one or more than one of the following components:

A debug port. The MCU of the EGS 150 often does not have an activated debug port, e.g. it is omitted or deactivated for security reasons. The emulation MCU, on the other hand, has an activated debug port. Optionally, the emulation MCU may comprise extended debug functionality, such as a trace module.

Random access memory (RAM): The working memory of the emulation MCU is at least as large as the working memory of the MCU of the EGS 150. If the emulation MCU comprises more random access memory than the MCU of the EGS 150, this may be hidden for the emulation or not used.

The flash memory of the emulation MCU is at least as large as the flash memory of the MCU of the EGS 150. If the emulation MCU comprises more flash memory than the MCU of the EGS 150, this may be used to implement additional functionality of the emulation, for example for additional interrupt handlers and for the reconstruction of the CPU registers.

One or more than one peripheral interface 1408: The peripheral blocks of the MCU of the EGS 150 are often tailored to the respective application for cost reasons. The emulation MCU may have additional peripheral blocks. This allows a more flexible use of the emulation for different hardware configurations and applications.

The emulation MCU may be controlled from the analysis PC via a debug adapter. This enables step-by-step execution of the program code, setting of breakpoints, analysis of the memory and more.

The peripheral emulator 1502 (also referred to as peripheral emulator or "peripheral emulation") comprises hardware for controlling the hardware interfaces of the emulation MCU. Depending on the target system, the peripheral emulator comprises, for example, one or more than one bus system (e.g., several different bus systems), one or more than one digital input and/or one or more than one analog input. In a specific instantiation, the peripheral emulator comprises one or more than one of the following components:

A control unit configured as an interface (also referred to as an analysis interface) to the analysis PC. The control unit comprises, for example, an additional MCU running a real-time operating system.

A real-time module configured as a port extension and/or for implementing time-critical processes. The real-time module is implemented by an FPGA ("Field Programmable Gate Array"), for example, and may therefore react to signals from the emulation MCU with clock accuracy and simulate case-specific attacks. Furthermore, an FPGA offers greater flexibility to dynamically implement components of the EGS 150. For example, the real-time module may be controlled by the control unit. Optionally, the real-time module may be supplemented by a function generator to emulate analog signals. The outputs are configured directly by the analysis PC. If required, synchronization is carried out using a signal from the control unit or the FPGA.

One or more than one interface comprises special interface modules, such as a CAN bus controller ("Controller Area Network Bus Controller") or a USB controller ("Universal Serial Bus Controller"), for example, if these are not implemented by the MCU of the control unit. This means that they may be synchronized with other signals by the real-time capable MCU of the peripheral emulator and do not have to be implemented separately in the FPGA.

An exemplary implementation of the emulation system 1450 for a generic EGS 150 (for example, for an STM32L476 based CPS) may comprise, for example, an STM32L476 Nucleo developer board with STM32L4 MCU. An exemplary implementation of the emulation system 1450 for a vendor-specific EGS 150 may comprise, for example, a vendor-specific developer board with Cortex M4 MCU and peripheral emulator. These two exemplary implementations are compared below:

| Component | Generic Emulation | Readout Emulation |
|---|---|---|
| CPU Core | Arm Cortex-M4 | Arm Cortex-M4 |
| Debug Interface | SWD | JTAG |
| Debug Probe | ST-LINK V2 | Green Hills Probe |
| Debugger | Gnu Debugger (GDB) | Green Hills Probe TimeMachine Debugger |
| Peripheral Emulator | Function Generator Rigol DG4162 | FPGA and Rigol DG4162 |

In a more complex implementation, the emulation system 1450 may be configured to perform an automatic analysis of the result of the extraction 350. This is explained below.

The emulation system 1450 may be configured:

importing the (e.g. decrypted) state data 302, e.g. comprising a register file, into "Ghidra" or another post-engineering module ("reverse engineering modules");

specify the architecture of the EGS 150 to be emulated (e.g. comprising an Arm v8 CPU core, little endian).

performing an automatic analysis of the state data 302 using "Ghidra", e.g. comprising a static analysis of the program code.

FIG. 15 illustrates an analysis system 1550 according to various embodiments 1500 in a schematic layout diagram and a detailed view 1501 comprising the emulation system

1450 according to embodiments 1400 (e.g., a CPS emulation system, CPS emulation for short).

The emulation system 1450 may, for example, be provided by means of an emulation board. The emulation system 1450 emulates, for example, the MCU of the EGS 150 (or CPS) and its peripherals (e.g., comprising one or more than one sensor and/or actuator). The emulation system 1450 is used to execute the malicious code to be analyzed, if any, and provides extended functionalities, such as one or more than one debug interface and peripheral components.

The system PC of the analysis system 1550 (generally also referred to as the environment emulation device) emulates the system PC of the attacked device (e.g. an ATM) comprising the EGS 150 or CPS. In addition to the actual functionality of a "normal" system PC, the system PC of the analysis system 1550 is configured to execute additional analysis software.

The analysis PC is configured to control the other components of the analysis system 1550. For example, on the analysis PC the software required for incident analysis is executed and the result of the extraction 350 (e.g. the status data 302) is stored.

The USB analyzer (also referred to as USB analyzer device) is configured to analyze the USB communication between the components of the analysis system 1550, for example the system PC and the emulation system 1450. The USB analyzer may, for example, be configured to record, manipulate, and/or import one or more than one message of the USB communication.

The CAN bus analyzer is configured to analyze the CAN bus communication (or more generally the communication via the communication infrastructure 1406 of the emulation system 1450). The analyzer offers the possibility of recording, manipulating and/or externally importing one or more than one message that is transmitted via the communication infrastructure 1406.

The function generator is configured for the synchronous emulation of sensor signals. For example, the analysis PC is configured to specifically import a signal synchronously with the CPS program sequence using the function generator.

The optional oscilloscope is configured to analyze peripheral and bus signals and the synchronous control of the function generator.

An (optionally controllable) laboratory power supply unit (not shown) is configured to supply power to the emulation system 1450. If the laboratory power supply unit is controllable, a power failure or another supply-related attack may be emulated by controlling the laboratory power supply unit (e.g. using the analysis PC).

The debug probe implements the debug protocols of the MCU of the EGS 150 (e.g. a so-called Joint Test Action Group (JTAG) or Single Wire Debug (SWD)) and connects the MCU of the emulation system 1450 with the analysis PC.

An exemplary implementation comprising the instantiation of the USB analyzer using "ellisys USB Explorer 200", the instantiation of the oscilloscope using "Lecroy Wave-Runner 640Zi", the instantiation of the function generator using "Rigol DG4162", the instantiation of the CAN bus analyzer using "Ixxat USB-to-CAN" and the instantiation of the debug probe using "STLink 2, Greenhills Probe".

In addition to the hardware components, the analyzing system 1550 also comprises one or more of the following software components for controlling the hardware and for analyzing the malicious code in interaction with the hardware:

An interactive dissassembler ("Interactive Dissassembler" or IDA for short) is configured to statically analyze the binary code. This includes the conversion into program code, the display of the execution graph or the analysis of references between program code and program data. In this exemplary implementation, "Hexrays IDA Pro" and/or "Ghidra" may be used;

A so-called "binwalk" is a tool for the static analysis of binary data, for example to extract embedded certificates or program code;

An analysis tool (also known as a wariness analysis tool) implements various utilities to analyze a malware image;

A debugger is configured to control the execution of the firmware in the emulation system 1450 (e.g. CPS emulation). The debugger is coupled to the MCU of the emulation system 1450 via the debug probe. This enables, for example, a step-by-step execution of the program, the setting of breakpoints and the inspection and modification of memory contents of the MCU. Depending on the application, a GNU debugger may be used in combination with "Open OCD" or the "Green Hills TimeMachine".

The debug interface of the 1450 emulation system may be used for reconstruction. This allows the programming of FLASH memory and the writing and reading of RAM and registers. The peripheral registers may be addressed in memory. Processor registers, for example, may only be accessed indirectly via special instructions.

In the following, various examples are described which relate to the above described and illustrated in the figures.

Example 1 is a forensics module for an embedded system, the forensics module comprising: a secured memory area comprising first data implementing (e.g. comprising or implementing by means of executable code segments) a (cryptographic) key: an interface for (e.g. bit-accurately) reading out second data representing a system state of the embedded system: and one or more than one processor configured for (e.g. bit-accurately) reading out the second data by means of the interface, wherein the second data comprises a plurality of data sets: determining a commitment of a plurality of aperture values, each aperture value being associated with exactly one of the plurality of data sets: (e.g. bit-accurate) reading of the second data by means of the interface, the second data comprising a plurality of data sets: determining a commitment to a plurality of opening values, each opening value being associated with exactly one of the plurality of data sets, based on the second data and using a cryptographic commitment process configured such that each data set may be individually verified using the commitment and the respective associated opening value: encrypting the second data and the plurality of opening values using the key.

Example 2 is the forensics module according to example 1, wherein the commitment process implements a cryptographic, preferably collision-resistant, hash function by means of which the commitment is determined.

Example 3 is the forensics module according to example 1 or 2, where the commitment process is a vector commitment process.

Example 4 is the forensics module according to any one of examples 1 to 3, wherein the commitment is bound to the plurality of opening values and/or the second data.

Example 5 is the forensics module according to any one of examples 1 to 4, wherein the one or more than one processor is further configured to determine the plurality of opening values (e.g. by means of a random number generator).

Example 6 is the forensics module according to any one of examples 1 to 5, wherein each of the plurality of opening values comprises a random string.

Example 7 is the forensics module according to any one of examples 1 to 6, wherein the commitment is determined based on the plurality of aperture values.

Example 8 is the forensics module according to any one of examples 1 to 7, further comprising: an additional interface, wherein the one or more than one processor is further configured to output the encrypted second data and the commitment by means of the additional interface.

Example 9 is the forensics module according to any one of examples 1 to 8, wherein the encryption is performed using the key by means of a symmetric encryption process.

Example 10 is the forensics module according to any one of the examples 1 to 9, wherein the determining of the comment and the encrypting of the second data are performed simultaneously (e.g. record-wise, e.g. record by record), e.g. in parallel.

Example 11 is the forensics module according to any one of examples 1 to 10, wherein the one or more than one processor is configured to start reading out the second data in response to one or more than one of the following events: receiving a system-external (originating from outside the embedded system) instruction (e.g., to interrupt and/or extract the system state), expiration of a timer (e.g., implemented in the root of the security chain, e.g., the forensics module and/or the embedded system), and/or malfunctioning of the embedded system (e.g., indicated by an error message).

Example 12 is the forensics module according to any one of examples 1 to 11, wherein the reading of the second data comprises stopping the embedded system (e.g. by means of an interrupt), preferably by means of a mechanism implemented in the root of the security chain (e.g. of the forensics module and/or the embedded system).

Example 13 is the forensics module according to any one of examples 1 to 12, wherein the reading of the second data is performed according to a stored data variable about at least one memory area (e.g. comprising one or more than one group of memory areas) of the embedded system to be read out, wherein the data variable comprises, for example, one tuple per memory area of the at least one memory area to be read out, which tuple indicates a memory address of the memory area and/or the length of the memory area.

Example 14 is the forensics module according to example 13, wherein one or more than one (e.g., each) of the plurality of records represents (e.g., representing the contents of) a group of memory areas of the at least one memory area to be read (e.g., the state or contents thereof).

Example 15 is the forensics module according to any one of examples 1 to 14, wherein (e.g., exactly) one of the plurality of data sets represents a processor register of the embedded system (e.g., its state or content).

Example 16 is the forensics module according to any one of examples 1 to 15, wherein the encrypting is performed using the key by means of an authenticated encryption process.

Example 17 is the forensics module according to any one of examples 1 to 16, wherein the encrypting using the key comprises encrypting the plurality of records iteratively (e.g., record-wise, e.g., record by record).

Example 18 is the forensics module according to any one of examples 1 to 17, wherein the encryption is performed using the key by means of a block cipher (also referred to as block cipher).

Example 19 is the forensics module according to any one of examples 1 to 18, wherein determining the commitment comprises processing the plurality of data records iteratively (e.g. record-wise, e.g. record by record), e.g. updating the commitment record by record.

Example 20 is the forensics module according to any one of examples 1 to 19, wherein the plurality of data sets comprise a first data set and a second data set, wherein determining the commitment comprises: determining a first commitment component based on the first data set and using the cryptographic commitment process: determining a second commitment component based on the second data set and using the cryptographic commitment process: merging the first commitment component and the second commitment component into the commitment.

Example 21 is the forensics module according to example 20, wherein the merging comprises: mapping a group comprising the first data set and the second data set to the Commitment, preferably using a hash function.

Example 22 is the forensics module according to example 20 or 21, wherein determining the first commitment component is further based on a first aperture value of the plurality of aperture values associated with the first data set: and/or wherein determining the second commitment component is further based on a second aperture value of the plurality of aperture values associated with the second data set.

Example 23 is the forensics module according to any one of examples 1 to 22, wherein the memory area is secured by means of one or more of: a firewall: a memory protection unit: a write protection: and/or a read protection.

Example 24 is the forensics module according to any one of examples 1 to 23, wherein the determining of the commitment comprises determining the plurality of opening values, preferably by means of a random value generator.

Example 25 is the forensics module according to any one of examples 1 to 24, wherein the interface is configured to read out a processor register and/or a peripheral register of the embedded system, wherein preferably the second data is read out from the processor register and/or the peripheral register by means of the interface.

Example 26 is the forensics module according to any one of examples 1 to 25, wherein the system state of the embedded system comprises a memory state of the embedded system.

Example 27 is the forensics module according to any one of examples 1 to 26, wherein the interface is further configured (e.g., enabled) to halt the embedded system, preferably its processor, and the second data is read from the halted embedded system.

Example 28 is the forensics module according to any one of examples 1 to 27, further comprising: a reserved memory area (e.g. provided by the embedded system), wherein the processor is configured to store the second data on the reserved memory area, preferably comprising an image of the processor register.

Example 29 is an embedded system comprising: the forensics module according to any one of examples 1 to 28; and one or more than one additional memory area (e.g. comprising random access memory and/or non-volatile memory, e.g. flash memory), wherein the interface is configured to read the second data from the one or more than one additional memory area.

Example 30 is the embedded system according to example 29, wherein the one or more than one additional memory area comprises a processor register and/or a peripheral register.

Example 31 is the embedded system according to example 29 or 30, which (e.g. its processor) is configured to control an actuator and/or a sensor and/or comprising the actuator or sensor.

Example 32 is the embedded system according to any one of the examples 29 to 31, which is implemented on exactly one printed circuit board and/or is arranged together with the actuator or sensor in a housing.

Example 33 is the embedded system according to any one of examples 29 to 32, further comprising: a firmware for controlling a sensor and/or an actuator, wherein the firmware is stored on the one or more than one additional memory area.

Example 34 is the embedded system according to any one of examples 29 to 33, further comprising: a reserved memory area in which the secured memory area is provided, wherein the reserved memory area is coupled to, for example, a processor of the embedded system.

Example 35 an ATM comprising the forensics module according to any one of examples 1 to 28 and/or the embedded system according to any one of examples 29 to 34, which is configured, for example, to provide a function of the ATM (e.g. in connection with depositing, presenting and/or withdrawing a value document and/or in connection with authenticating a person).

Examples 36 is the ATM according to example 35, further comprising: the actuator (e.g. actuator) and/or the sensor:

Examples 37 is the ATM according to example 36, further comprising: a payout module comprising, for example, the actuator and/or sensor: or a cash cassette comprising the actuator and/or sensor.

Example 38 is a method for an embedded system (e.g., according to any one of examples 29 to 34), the method comprising: reading out (e.g., by means of the forensics module according to any one of examples 1 to 28) data (e.g. the second data) representing a system state of the embedded system by means of the interface configured to read the data, wherein the data comprises a plurality of data sets: determining a commitment to a plurality of opening values, each opening value being associated with exactly one of the plurality of data sets, based on the data and using a cryptographic commitment process configured such that each data set may be individually verified based on the commitment and the respective associated opening value: encrypting the data and the plurality of opening values using a key implemented by means of additional data (e.g. the first data): and encrypting the data and the plurality of opening values using a key implemented by means of additional data (e.g. the first data) stored on a secure storage area: wherein the method may optionally be configured analogous to any one of examples 1 to 37.

Example 39 is a non-volatile storage medium comprising code segments configured, when executed by a processor, to cause the processor to perform the method of example 38.

Example 40 is a computer program configured, when executed by a processor, to cause the processor to perform the method of example 38.

Example 41 is a control device configured to perform the method according to example 38.

The invention claimed is:

1. A forensics module for an embedded system, the forensics module comprising:
   a secured memory area comprising first data implementing a key;

an interface for reading second data representing a system state of the embedded system; and
   one or more than one processor
   configured to:
       read the second data with the interface, wherein the second data comprises a plurality of data records;
       determine a commitment to a plurality of opening values, wherein each opening value is assigned to exactly one of the plurality of data records based on the second data and using a cryptographic commitment process configured such that each data record may be verified individually using the commitment and the respectively assigned opening value; and
       encrypt the second data and the plurality of opening values using the key.

2. The forensics module according to claim 1, wherein the commitment process implements a cryptographic, collision-resistant, hash function by which the commitment is determined.

3. The forensics module according to claim 1 wherein the commitment process is a vector commitment process.

4. The forensics module according to claim 1, wherein the commitment is bound to the plurality of opening values and the second data.

5. The forensics module according to claim 1, further comprising:
   an additional interface;
   wherein the one or more than one processor is further configured to output the encrypted second data and the commitment with the additional interface.

6. The forensics module according to claim 1 wherein the encrypting is performed using the key by a symmetric encryption process.

7. The forensics module according to claim 1 wherein the encrypting is performed using the key by an authenticated encryption process.

8. The forensics module according to claim 1 wherein the encrypting comprises using the key to iteratively encrypt the plurality of data records.

9. The forensics module according to claim 1 wherein the memory area is secured by one or more of the following:
   a firewall;
   a memory protection unit;
   write protection; and
   a read protection.

10. The forensics module according to claim 1 wherein the determining of the commitment comprises determining the plurality of opening values.

11. The forensics module according to claim 1 wherein the interface is configured to read out a processor register of the embedded system.

12. The forensics module according to claim 11, wherein the second data comprises an image of the processor register of the embedded system.

13. The forensics module according to claim 1 wherein determining the commitment and encrypting the second data are performed simultaneously.

14. The forensics module according to claim 1 wherein the interface is further configured to halt the embedded system, and the second data is read out from the halted embedded system.

15. An embedded system comprising:
   a forensics module comprising:
       a secured memory area comprising first data implementing a key;

an interface for reading second data representing a system state of the embedded system; and one or more than one processor configured to:

read the second data with the interface, wherein the second data comprises a plurality of data records;

determine a commitment to a plurality of opening values, wherein each opening value is assigned to exactly one of the plurality of data records based on the second data and using a cryptographic commitment process configured such that each data record may be verified individually using the commitment and the respectively assigned opening value; and encrypt the second data and the plurality of opening values using the key; and one or more than one additional memory area, wherein the interface is configured to read the second data from the one or more than one additional memory area;

wherein the one or more than one additional memory area comprises a processor register.

16. The embedded system according to claim 15, further comprising:

an actuator; and a sensor; and firmware for controlling the sensor and the actuator, wherein the firmware is stored on the one or more than one additional memory area.

17. A method for an embedded system, the method comprising:

reading out data representing a system state of the embedded system by an interface configured to read out the data, wherein the data comprises a plurality of data records;

determining a commitment to a plurality of opening values, wherein each opening value is assigned to exactly one of the plurality of data records based on the data and using a cryptographic commitment process configured such that each data record may be verified individually using the commitment and the respectively assigned opening value; and encrypting the data and the plurality of opening values using a key implemented by additional data stored on a secured storage area.

18. Non-transitory storage medium comprising code segments configured to, when executed by a processor, cause the processor to perform a method for an embedded system the method comprising:

reading out data representing a system state of the embedded system by an interface configured to read out the data, wherein the data comprises a plurality of data records;

determining a commitment to a plurality of opening values, wherein each opening value is assigned to exactly one of the plurality of data records based on the data and using a cryptographic commitment process configured such that each data record may be verified individually using the commitment and the respectively assigned opening value; and encrypting the data and the plurality of opening values using a key implemented by additional data stored on a secured storage area.

* * * * *